United States Patent
Tachi

(10) Patent No.: US 9,253,459 B2
(45) Date of Patent: Feb. 2, 2016

(54) IMAGE PROCESSING APPARATUS AND IMAGE PROCESSING METHOD, AND PROGRAM

(71) Applicant: Sony Corporation, Tokyo (JP)

(72) Inventor: Masayuki Tachi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/370,338

(22) PCT Filed: Nov. 29, 2012

(86) PCT No.: PCT/JP2012/080872
§ 371 (c)(1),
(2) Date: Jul. 2, 2014

(87) PCT Pub. No.: WO2013/111449
PCT Pub. Date: Aug. 1, 2013

(65) Prior Publication Data
US 2014/0347528 A1    Nov. 27, 2014

(30) Foreign Application Priority Data
Jan. 24, 2012 (JP) .................................. 2012-011716

(51) Int. Cl.
| H04N 9/64 | (2006.01) |
| G06T 3/40 | (2006.01) |
| H04N 5/367 | (2011.01) |
| H04N 9/04 | (2006.01) |

(52) U.S. Cl.
CPC ............... *H04N 9/646* (2013.01); *G06T 3/4015* (2013.01); *H04N 5/367* (2013.01); *H04N 9/045* (2013.01); *H04N 2209/042* (2013.01)

(58) Field of Classification Search
CPC ....... H04N 9/646; H04N 5/367; H04N 5/217; H04N 5/2173; H04N 5/357
USPC ............................................ 348/241, 242, 246
See application file for complete search history.

(56) References Cited

U.S. PATENT DOCUMENTS

| 6,833,868 | B1 * | 12/2004 | Meynants et al. ............. 348/272 |
| 8,125,543 | B2 * | 2/2012 | Cho ..................... H04N 5/2351 |
| | | | 348/241 |

(Continued)

FOREIGN PATENT DOCUMENTS

| JP | 2003-224861 | 8/2003 |
| JP | 2007-288395 | 11/2007 |

(Continued)

*Primary Examiner* — Sinh Tran
*Assistant Examiner* — Zhenzhen Wu
(74) *Attorney, Agent, or Firm* — Wolf, Greenfield & Sacks, P.C.

(57) ABSTRACT

An apparatus for and a method of executing noise reduction processing and defect compensation processing on an image in an RGBW arrangement are provided. In pixel value compensation processing of a color pixel that makes up image data in the RGBW arrangement that has each color pixel of R, G, and B and a white (W) pixel, the W pixel is interpolated at a position of an attention pixel that is a compensation target, and at a position of a reference pixel which has the same color as an attention pixel within a reference area, smoothing weight is calculated based on each pixel value of the interpolation W pixel, and thus a compensation pixel value of the attention pixel is calculated by executing smoothing processing to which the calculated smoothing weight is applied. Moreover, by applying the W pixel in the neighborhood of the color pixel, it is determined whether or not the color pixel is in a texture area, and only if the color pixel is not in the texture, defect compensation processing is executed.

10 Claims, 18 Drawing Sheets

(56) References Cited

U.S. PATENT DOCUMENTS

2003/0142876 A1* 7/2003 Sugimoto et al. ............ 382/250
2008/0124000 A1* 5/2008 Sato et al. .................... 382/300
2011/0050918 A1* 3/2011 Tachi ........................ 348/208.4
2012/0250994 A1* 10/2012 Shinozaki et al. ........... 382/167

FOREIGN PATENT DOCUMENTS

| JP | 2009-253616 | 10/2009 |
| JP | 2011-055038 | 3/2011 |
| JP | 2011-076186 | 4/2011 |

* cited by examiner

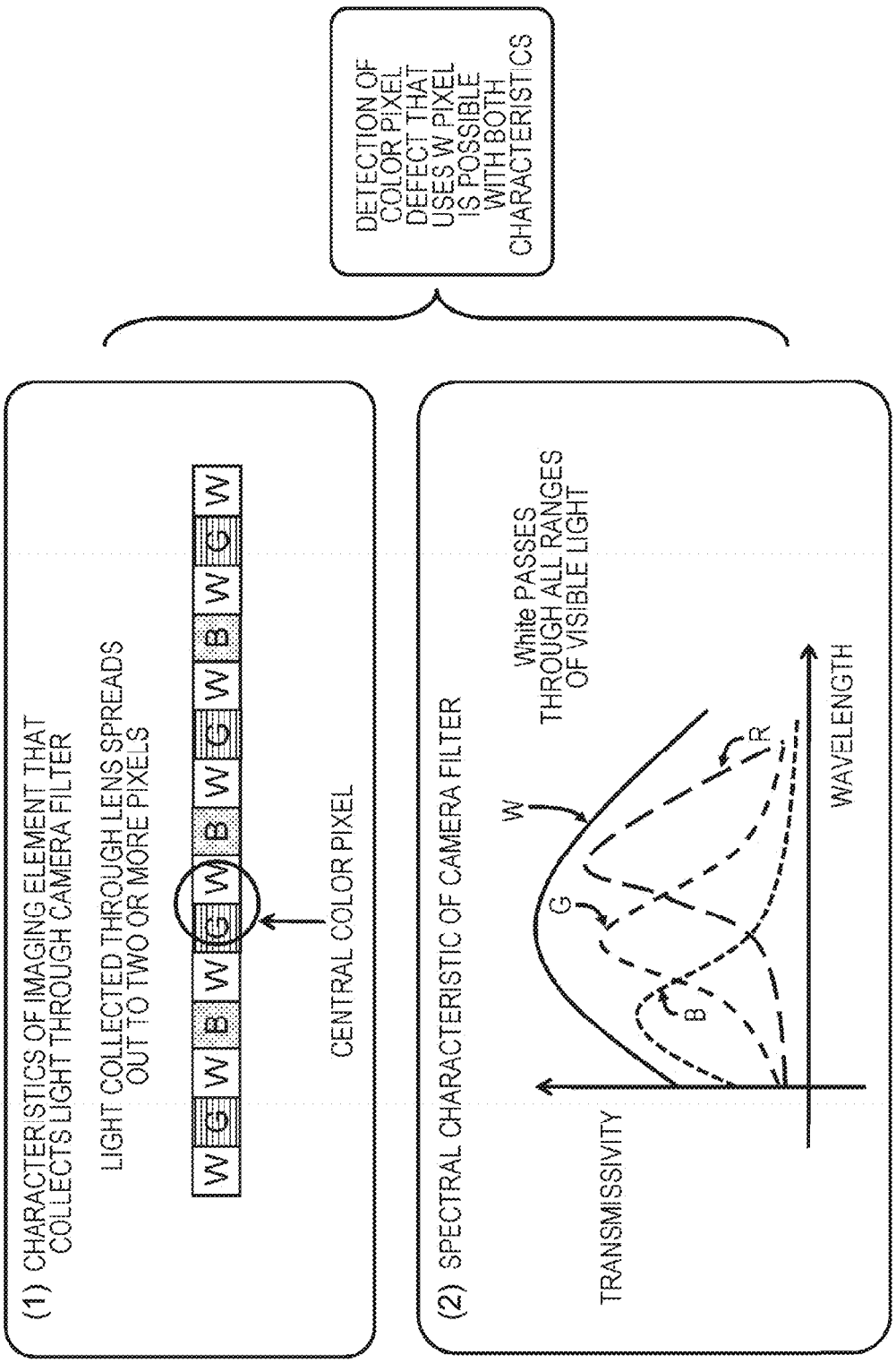

FIG. 12

EXAMPLE 1 OF DEFECT DETECTION PROCESSING
(DETECTION OF LIKELIHOOD OF DEFECT)

DETECTION OF MAXIMUM VALUE (max) AND MINIMUM VALUE (min)

IF IT IS ASSUMED FROM PROBABILITY OF DEFECT OCCURRENCE THAT MULTIPLE DEFECTS DO NOT OCCUR WITHIN TAP HAVING THE SAME COLOR AS REFERENCE, THERE IS A LIKELIHOOD THAT AN ATTENTION PIXEL WILL BE DEFECTIVE AT THE TIME OF A MAXIMUM VALUE OR A MINIMUM VALUE.

| W | G (x-8) | W | R | W | G (x-4) | W | R | W | G (x) | W | R | W | G (x+4) | W | R | W | G (x+8) | W |

↑ COMPENSATION TARGET PIXEL (ATTENTION PIXEL)

$If(G(x)) = \max(G(x-8), G(x-4), G(x), G(x+4), G(x+8))$ LIKELIHOOD OF WHITE DOT DEFECT IS PRESENT $If(G(x)) = \min(G(x-8), G(x-4), G(x), G(x+4), G(x+8))$ LIKELIHOOD OF BLACK DOT DEFECT IS PRESENT

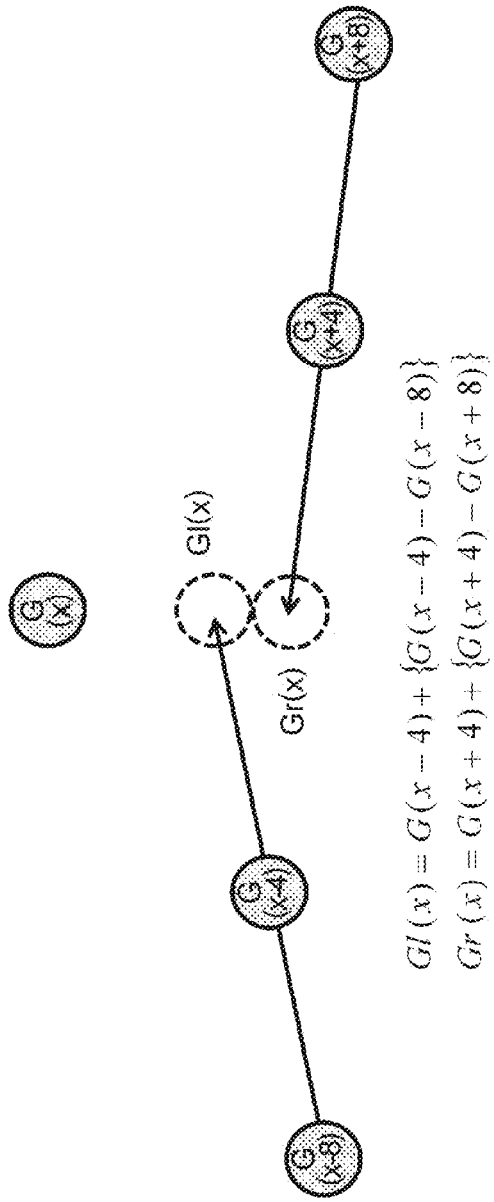

FIG. 14

(a) EXAMPLE OF DEFECT DETECTION (TEXTURE DETECTION)

EXAMPLE OF ASSIGNING PIXEL FOR TEXTURE DETECTION

COMPENSATION TARGET PIXEL (ATTENTION PIXEL)

PIXEL ARRANGEMENT: W(x-3) | R | W(x-1) | G(x) | W(x+1) | R | W(x+3)

SIGNAL LEVEL / COORDINATE

COMPENSATION ATTENTION PIXEL

(b) TEXTURE DETECTION SEQUENCE

DETECTION OF CONVEX TEXTURE:

1. IN A CASE OF A TEXTURE, A LEVEL OF ADJACENT W ALSO GOES UP
   → A MAXIMUM VALUE OF THE ADJACENT W IS CALCULATED

2. LOCAL AVERAGE LEVEL OF W IS CALCULATED
   → A MINIMUM VALUE OF OUTSIDE TWO W PIXELS IS CALCULATED
   (IS SET STRICTLY IN ORDER TO SUPPRESS ERRONEOUS DETECTION)

3. IF A DIFFERENCE BETWEEN THE LOCAL AVERAGE LEVEL (2) AND THE MAXIMUM VALUE (1) OF THE ADJACENT W IS A THRESHOLD OR ABOVE, IT IS DETERMINED THAT TEXTURE IS PRESENT
   → COMPENSATION IS NOT PERFORMED $$If\left(\left(Max(W_{(x-1)}, W_{(x+1)}) - Min(W_{(x-3)}, W_{(x+3)})\right) > Th\right)$$

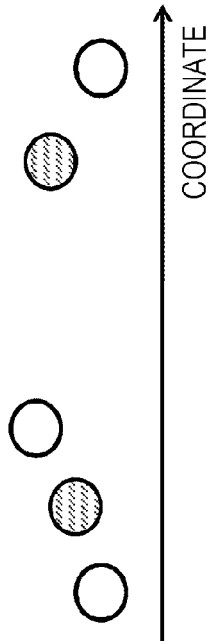

MAXIMUM VALUE OF ADJACENT W     MINIMUM VALUE OF OUTSIDE W

CONCAVE-SHAPED TEXTURE PROCESSING ALSO IS PERFORMED IN THE SAME MANNER.

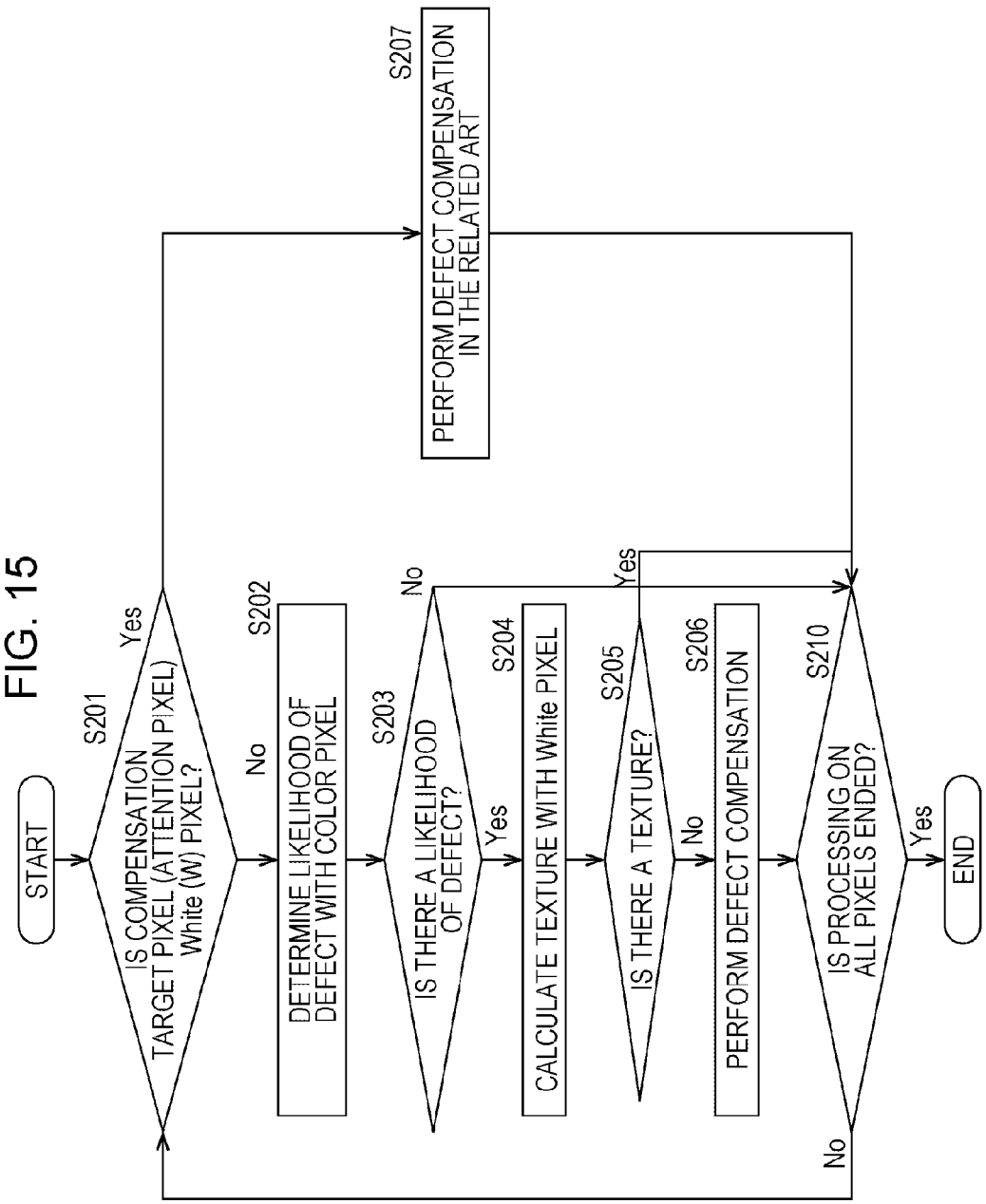

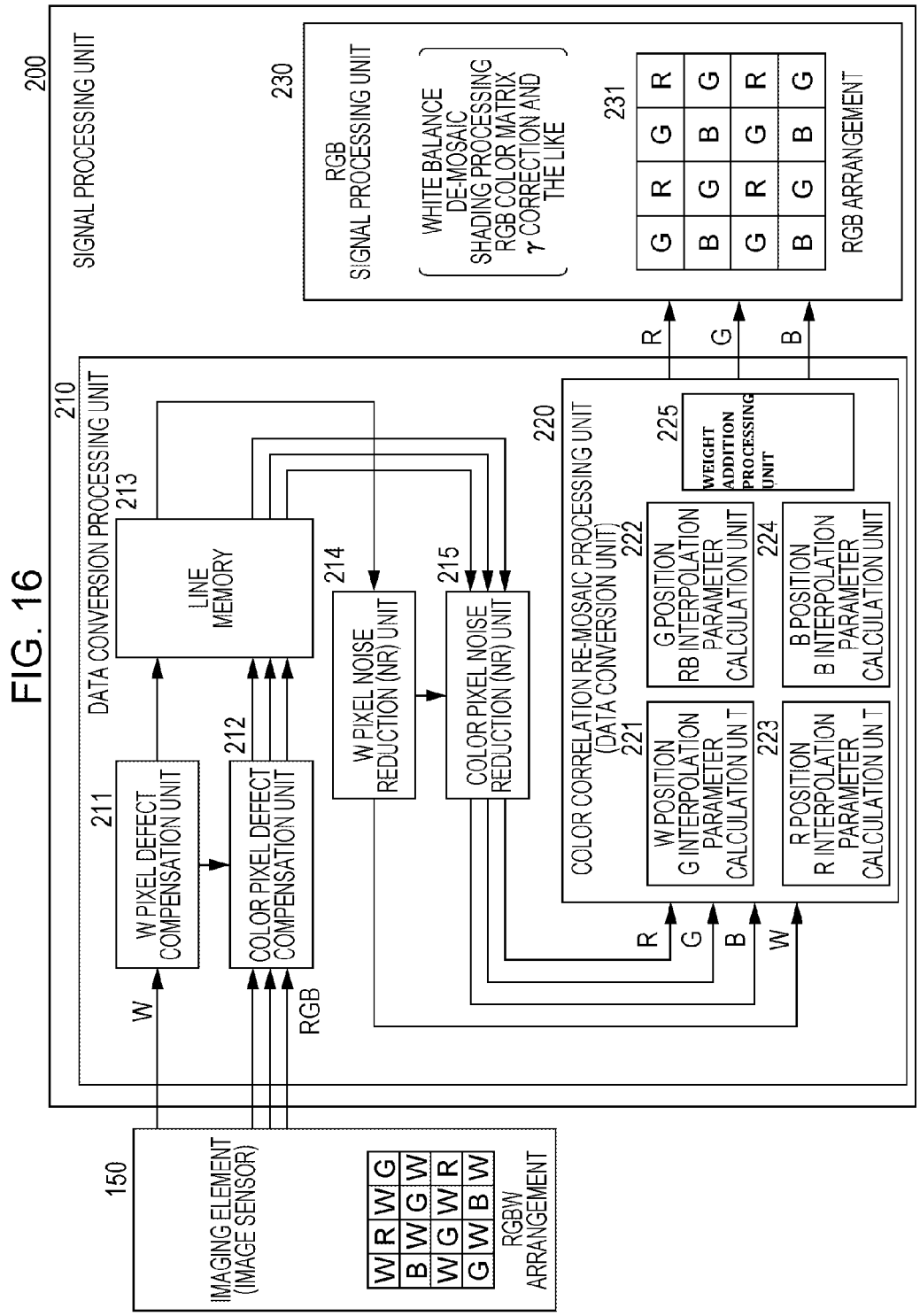

IMAGE PROCESSING APPARATUS AND IMAGE PROCESSING METHOD, AND PROGRAM

CROSS-REFERENCE TO RELATED APPLICATIONS

This application is the National Stage of International Application No. PCT/JP2012/080872, filed in the Japanese Patent Office as a Receiving Office on Nov. 29, 2012, which claims priority to Japanese Patent Application Number 2012-011716, filed in the Japanese Patent Office on Jan. 24, 2012, each of which is hereby incorporated by reference in its entirety.

TECHNICAL FIELD

The present disclosure relates to an image processing apparatus and an image processing method, and a program, and relates particularly to an image processing apparatus for and an image processing method of, and a program for performing compensation of pixels including noise or defective pixels that make up an image.

BACKGROUND ART

For a filter that is used in an imaging element in an imaging apparatus, such as a digital camera, for example, a Bayer arrangement and the like in which R, G, and B colors are arranged is used in most cases, but a filter has been proposed that has an RGBW arrangement including all-wavelength transmission type white (W) pixels, which includes all wavelength areas of the R, G, and B in addition to the R, G, and B colors.

However, problems with reduction processing of noise that is included in an image that is captured using the RGBW arrangement filter and that has the white (W) pixels are as follows. Color pixels of the R, G, B and the like are lower in sensitivity and are greater in an amount of noise than the white (W) pixels, and furthermore, the number of reference pixels that are usable to calculate a compensation pixel value of an attention pixel that is a noise reduction target, that is, the number of samples of the reference pixels which have the same color as a compensation target pixel is small. As a result, there is a problem in that even though the noise reduction (NR) processing that refers to the pixels which have the same color is executed, a sufficient noise reduction effect cannot be obtained.

Furthermore, if an object is to address a model, like a light shot noise, in which noise changes according to optical strength, this causes a problem in that smoothing strength varies widely due to noise staying on the pixel itself and a signal level is lowered.

Furthermore, because color-pixel sampling positions are scattered in defect compensation in a white (W) arrangement, it is difficult to distinguish between a defect and a texture, and there is a problem in that an effect of sufficient compensation cannot be obtained.

Moreover, as the related art relating to the processing that reduces noise in the image is disclosed, there are, for example, PTL 1 (Japanese Unexamined Patent Application Publication No. 2003-224861), PTL 2 (Japanese Unexamined Patent Application Publication No. 2011-76186, and the like.

PTL 1 (Japanese Unexamined Patent Application Publication No. 2003-224861) discloses a configuration in which noise is reduced by reducing a frequency component of a color difference signal (C) of each area according to a frequency component strength of a luminance signal (Y). However, because this technique performs reduction of noise in the C signal, based on the Y signal even at a point where there is no relationship between the luminance signal (Y) and the color difference signal (C), there is a concern in that the color difference signal will be lost at a point where a luminance change rarely occurs, such as a color texture.

In PTL 2 (Japanese Unexamined Patent Application Publication No. 2011-76186), there is disclosed a technique that performs determination of a texture direction using a W pixel, and based on the result of the determination, performs the defect compensation. PTL 2 discloses the technique of performing defect compensation on the W pixel, but not a method of performing compensation on color pixels other than W. Furthermore, there is a problem in that an arithmetic operation cost is increased because of a variety of direction determination processing subject to two-dimensional processing that refers to pixels in upward, downward, leftward and rightward directions on a two-dimensional plane.

CITATION LIST

Patent Literature

PTL 1: Japanese Unexamined Patent Application Publication No. 2003-224861
PTL 2: Japanese Unexamined Patent Application Publication No. 2011-76186

SUMMARY OF INVENTION

Technical Problem

In view of the problems described above, an object of the present disclosures is to provide an image processing apparatus for and an image processing method of, and a program for performing reduction in noise that is included in an image that is captured through a filter equipped with an all-wavelength transmission type white (W) pixel or performing defect compensation.

Solution to Problem

The first aspect of the present disclosure provides an image processing apparatus including: a signal processing unit that executes pixel value compensation, in which the signal processing unit inputs image data in an RGBW arrangement that has each color pixel of R, G, and B and a white (W) pixel that passes through almost all wavelength light of each wavelength of the R, G, and B, and in which the signal processing unit interpolates the W pixel at a position of an attention pixel that is a compensation target and at a position of a reference pixel which has the same color as the attention pixel within a reference area, in a pixel value compensation processing of a color pixel, calculates smoothing weight based on each pixel value of the interpolation W pixel, and thus calculates a compensation pixel value of the attention pixel by executing smoothing processing to which the calculated smoothing weight is applied.

In an embodiment of the image processing apparatus according to the disclosure, the signal processing unit may determine whether or not one or more saturation pixel values are present in the pixel values of the interpolation W pixel, and if the saturation pixel value is not present in the pixel values of the interpolation W pixel, the signal processing unit may calculate a compensation pixel value of the attention pixel by executing the smoothing processing to which the smoothing weight, calculated based on the each pixel value of the interpolation W pixel, is applied, and if the saturation pixel value is present in the pixel values of the interpolation W pixel, the signal processing unit may calculate the compensation pixel value of the attention pixel by executing the smoothing processing to which the smoothing weight, calculated based on each pixel value of the attention pixel that is the compensation target, and of the reference pixel which has the same color as the attention pixel within the reference area, is applied without applying the interpolation W pixel.

In an embodiment of the image processing apparatus according to the disclosure, the signal processing unit may execute processing that interpolates the W pixel at the position of the reference pixel which has the same color as the attention pixel present in the reference area that is a two-dimensional area with the reference area as the two-dimensional area.

In an embodiment of the image processing apparatus according to the disclosure, the signal processing unit may execute processing that interpolates the W pixel at the position of the reference pixel which has the same color as the attention pixel present in the reference area that is a one-dimensional area with the reference area as the one-dimensional area.

In an embodiment of the image processing apparatus according to the disclosure, the signal processing unit may execute the pixel value compensation as noise reduction (NR) processing that reduces noise that is included in the attention pixel.

In an embodiment of the image processing apparatus according to the disclosure, the signal processing unit may determine a likelihood of a defect, that is, determines whether or not there is a likelihood that the color pixel will be a defective pixel, in which the signal processing unit may execute texture detection processing that determines whether or not the color pixel is in a texture area, by applying the W pixel in the neighborhood of the color pixel that is determined as having the likelihood of the defect, and in the texture detection processing, if it is determined that the color pixel is in the texture area, the signal processing unit may not execute defect compensation processing, and in the texture detection processing, if it is determined that the color pixel is not in the texture area, the signal processing unit may execute the defect compensation processing.

In an embodiment of the image processing apparatus according to the disclosure, in the texture detection processing, the signal processing unit may determine whether or not the color pixel is in the texture area, by applying a difference in the pixel value between the W pixel that is closest to the color pixel that is determined as having the likelihood of the defect, and the W pixel outside of the closest W pixel.

The second aspect of the present disclosure provides an image processing method of executing pixel value compensation in an image processing device, in which a signal processing unit of the image processing device performs: inputting image data in an RGBW arrangement that has each color pixel of R, G, and B and a white (W) pixel that passes through almost all wavelength light of each wavelength of the R, G, and B; interpolating the W pixel at a position of an attention pixel that is a compensation target, and at a position of a reference pixel which has the same color as the attention pixel within a reference area, in a pixel value compensation processing of a color pixel; calculating smoothing weight based on each pixel value of the interpolation W pixel; and calculating a compensation pixel value of the attention pixel by executing smoothing processing to which the calculated smoothing weight is applied.

The third aspect of the present disclosure provides a program for executing pixel value compensation in an image processing apparatus, which causes a signal processing unit of the image processing apparatus to perform: inputting image data in an RGBW arrangement that has each color pixel of R, G, and B and a white (W) pixel that passes through almost all wavelength light of each wavelength of the R, G, and B; interpolating the W pixel at a position of an attention pixel that is a compensation target, and at a position of a reference pixel which has the same color as the attention pixel within a reference area, in a pixel value compensation processing of a color pixel; calculating smoothing weight based on each pixel value of the interpolation W pixel; and calculating a compensation pixel value of the attention pixel by executing smoothing processing to which the calculated smoothing weight is applied.

Moreover, it is possible that the program according to the present disclosure, for example, is provided using a storage medium or a communication medium that is provided in a computer-readable format to an information processing apparatus or a computer•system that is capable of executing a variety of programs•codes. By providing such a program in the computer-readable format, the processing according to the program on the information processing apparatus or the computer•system is realized.

Other objects, features, and advantages according to the present disclosure are apparent from examples according to the present disclosure, which are described below, or from a more detailed description that is based on that attached drawings. Moreover, the system in the present specification is configured to be a logical combination of multiple apparatuses, and the apparatuses in each configuration are not limited to being within the same housing.

Advantageous Effects of Invention

With a configuration of an example according to the present disclosure, an apparatus for and a method of executing noise reduction processing and defect compensation processing on an image in an RGBW arrangement are realized.

Specifically, in pixel value compensation processing of a color pixel that makes up image data in the RGBW arrangement that has each color pixel of R, G, and B and a white (W) pixel, the W pixel is interpolated at a position of an attention pixel that is a compensation target, and at a position of a reference pixel which has the same color as the attention pixel within a reference area, smoothing weight is calculated based on each pixel value of the interpolation W pixel, and thus a compensation pixel value of the attention pixel is calculated by executing smoothing processing to which the calculated smoothing weight is applied. Moreover, by applying the W pixel in the neighborhood of the color pixel, it is determined whether or not the color pixel is in a texture area, and only if the color pixel is not in the texture, defect compensation processing is executed.

With such processing, the apparatus for and the method of executing the noise reduction processing and the defect compensation processing on the image in the RGBW arrangement are realized.

BRIEF DESCRIPTION OF DRAWINGS

FIG. 1 is a diagram for describing an example of an RGBW arrangement.

FIG. 2 is a diagram for describing a decrease in a density of color pixels in the RGBW arrangement.

FIG. 11 is a diagram for describing an outline of defect compensation processing.

FIG. 12 is a diagram for describing an example of general detection processing of a pixel defect.

FIG. 13 is a diagram for describing an example of the general detection processing of the pixel defect.

FIG. 14 is a diagram for describing one example of processing that detects a texture from an image, which is executed in the image processing apparatus according to the present disclosure.

FIG. 15 is a diagram illustrating a flow chart for describing a processing sequence for the defect compensation processing that is executed in the image processing apparatus according to the present invention.

FIG. 16 is a diagram for describing a configuration of and processing by the image processing apparatus according to the present disclosure.

DESCRIPTION OF EMBODIMENTS

Figure 3:
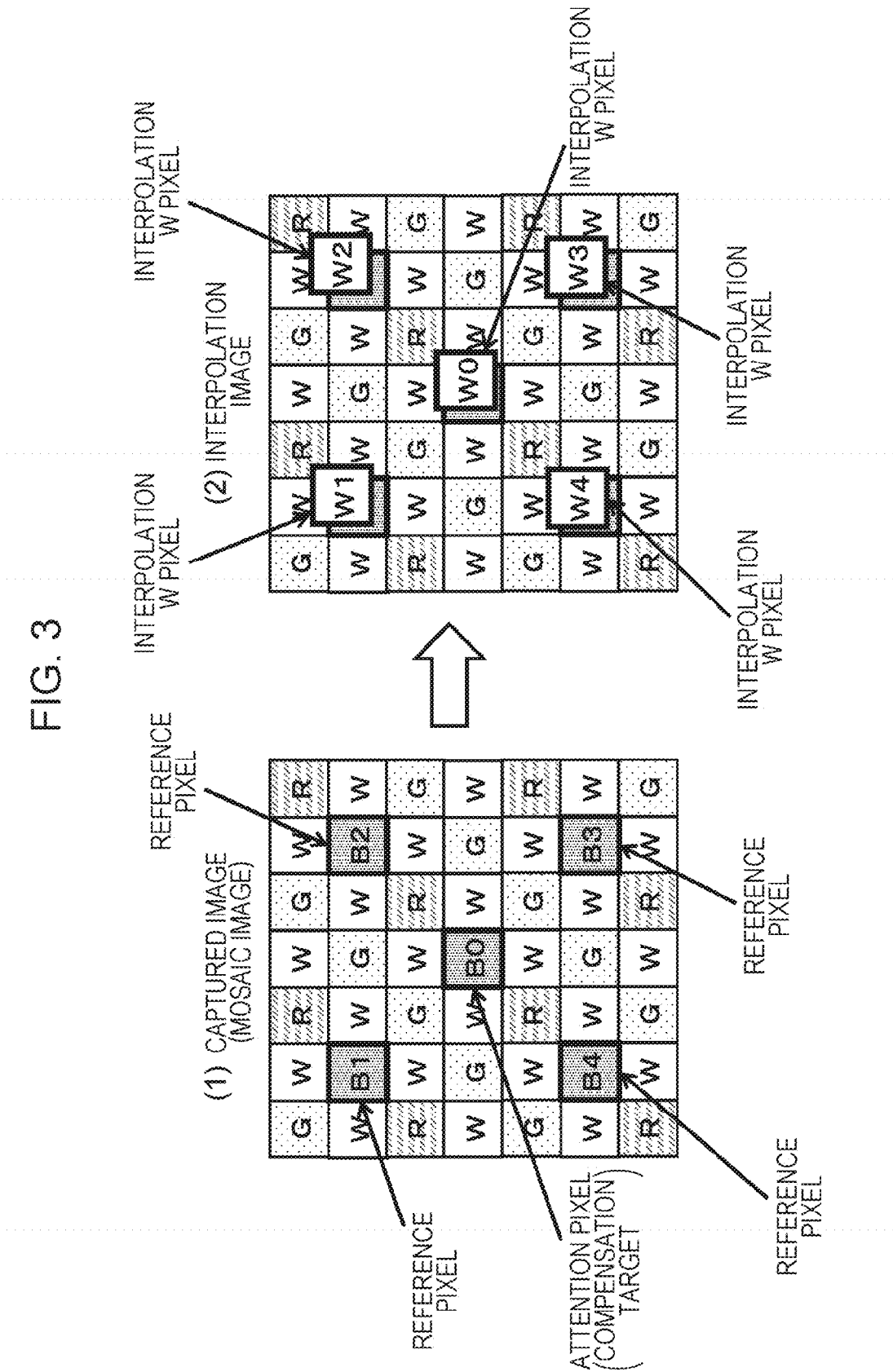
FIG. 3 is a diagram for describing a specific example of noise reduction processing that is executed in an image processing apparatus according to the present disclosure.

An image processing apparatus, an image processing method, and a program according to the present disclosure are described in detail below referring to the drawings. Moreover, descriptions are provided below under the following headings.

1. Pixel Arrangement Including All-Wavelength Transmission Type W (White) Pixels
2. Example of Processing that Calculates a Compensation Pixel Value of a Color Pixel by Interpolating a W Pixel at a Pixel Position of the Color Pixel that is a Compensation Target and Applying the Interpolation W Pixel
3. Example of Processing that Performs Defect Compensation according to a Result of Texture Detection to which the W pixel is applied in Compensation Processing of the Color Pixel that is a Defect Compensation Target
4. Configuration example of an Imaging Processing Apparatus
4-1. Configuration Example 1 of the Image Processing Apparatus
4-2. Configuration Example 2 of the Image Processing Apparatus
4-3. Configuration Example 3 of the Image Processing Apparatus
5. Conclusions of Configurations of the Present Disclosure

[1. Pixel Arrangement Including all-Wavelength Transmission Type W (White) Pixels]

First, an example of a pixel arrangement that includes all-wavelength transmission type W (white) pixels, that is, an example of an arrangement of pixels of the imaging element capturing an image that is a target for noise reduction processing or defect compensation processing in the image processing apparatus according to the present disclosure is described.

As described above, in an imaging apparatus such as a digital camera, a Bayer arrangement in which R, G, and B colors are arranged as filters used in the image element is widely known, but recently, a filter has been proposed that has an RGBW arrangement that includes all-wavelength transmission type W (white) pixels that allow light of the R, G, and B colors in almost all wavelength ranges of the R, G, and B colors to pass through.

Figure 1:
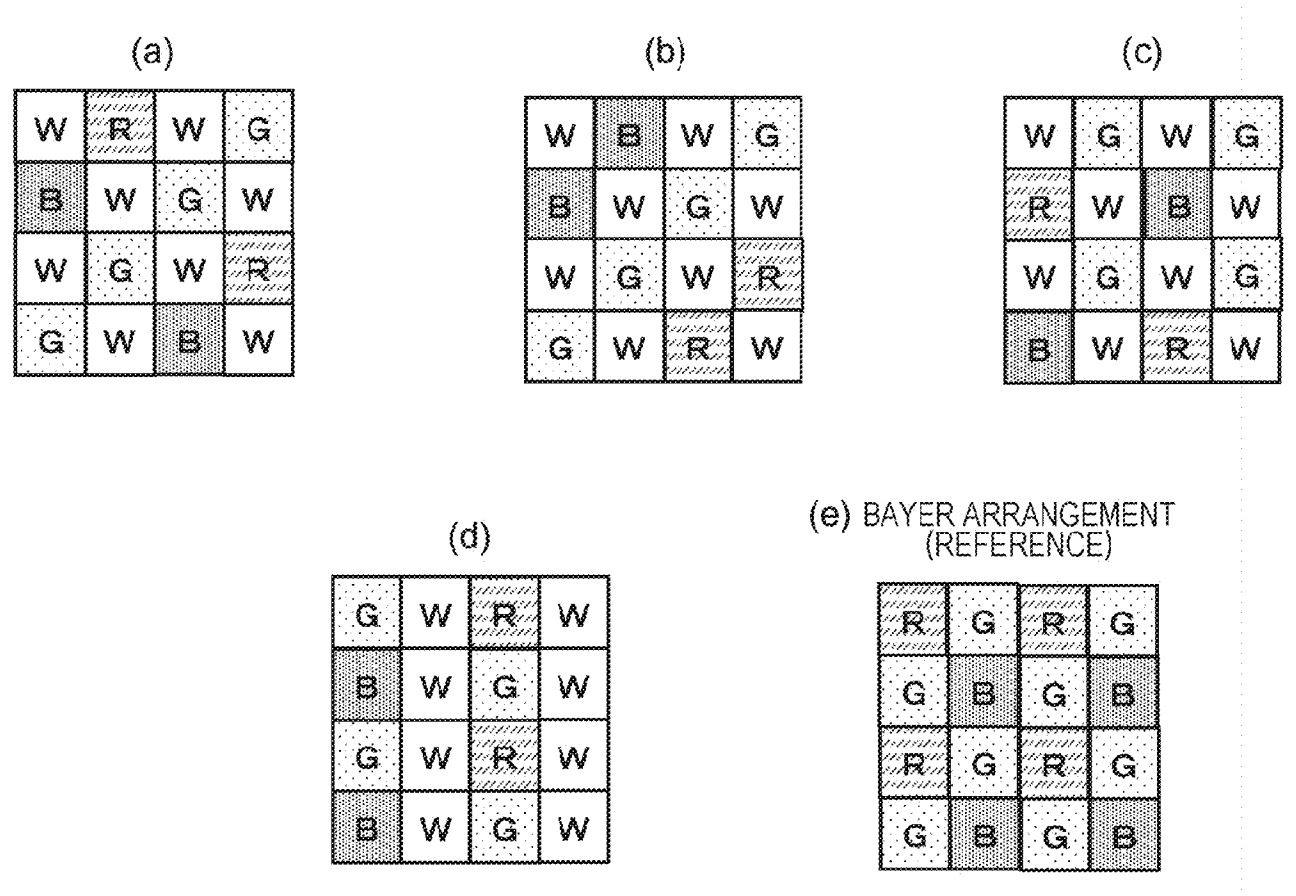

A specific example of the RGBW arrangement is an RGBW arrangement that is illustrated in FIGS. 1(a) to 1(d). Moreover, FIG. 1(e) illustrates, as a reference example, a Bayer arrangement that is a general RGB arrangement.

As illustrated in FIG. 1, various arrangements, each of which has the W pixels, have been proposed, but by using the W pixel, a color pixel density of the R, G, and B colors is decreased compared to a Bayer arrangement in the related art.

In most cases, as processing that reduces noise included in the image, processing is performed that selects as the reference pixels neighborhood pixels that have the same color as a noise reduction-target pixel (attention pixel) and calculates the compensation pixel value of the noise reduction pixel using the pixel values of the reference pixels.

However, for example, the density of the R, G, and B pixels in the RGBW arrangements that are illustrated in FIGS. 1(a) to 1(d) is decreased compared to the Bayer arrangement that is illustrated in FIG. 1(e). Therefore, the reference pixels that are usable in a case where the compensation processing is performed for the purpose of noise reduction in each of the R, G, and B pixels, that is, the neighborhood pixels that have the same color as the compensation target pixel and that are available for reference are decreased in number. That is, the number of the color pixels that have the same color per unit area is decreased. As a result, a problem that the pixel values of the reference pixels of which the number is sufficient cannot be used and compensation precision is decreased occurs.

Figure 2:
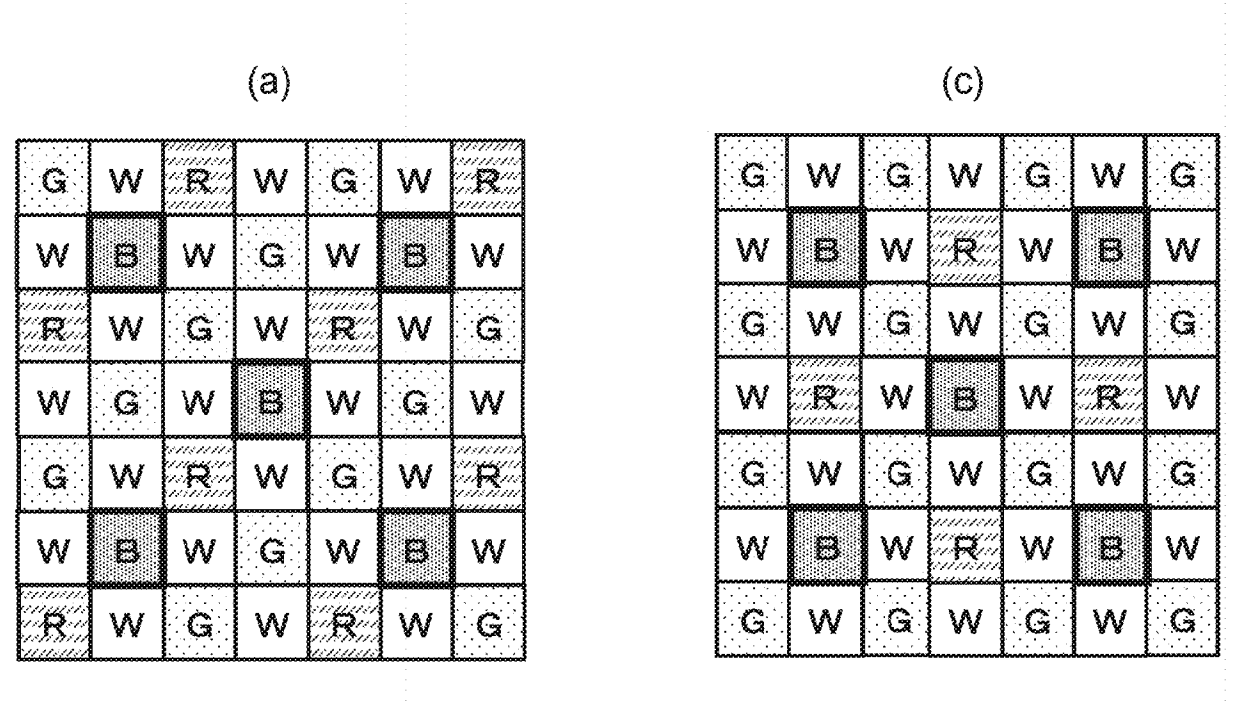

A specific example is described referring to FIG. 2.

FIG. 2 is a diagram illustrating the 7×7 pixel area in each of the RGBW pixel arrangements illustrated in FIGS. 1(a) and 1(c).

For example, in FIG. 2(a), the central pixel (B) in the 7×7 pixel area is set to be the attention pixel, that is, the noise reduction-target pixel. The 7×7 pixel area of which the center is the attention pixel is set to be the reference area of which the center is the attention pixel. Processing is executed that calculates the compensation pixel value of the attention pixel, that is, a noise reduction pixel value by selecting as the reference pixel the pixel that has the same color as the attention pixel which is included in the reference area and by using the pixel value of the reference value.

However, as illustrated in FIG. 2(a), as few as four B pixels that have the same color as the B pixel that is a central pixel are included in a 7×7 pixel reference area.

Moreover, if the noise reduction processing is performed, for example, processing is performed that calculates the compensation pixel value of the attention pixel by assigning weight that depends on the difference in the pixel value between the attention pixel which is the compensation target pixel and the reference pixel and by executing addition for weighting and the like. That is, compensation processing that changes the pixel value of the attention pixel, so-called smoothing processing is performed in such a manner as to smooth the pixel values of the attention pixel and the reference pixel in the vicinity of the attention pixel that has the same color as the attention pixel. However, when the number of the reference pixels is small, for example, when even one error pixel is included in in the compensation target pixels or the reference pixels, or in other cases, there is a problem in that a trend of calculating the unnatural compensation pixel value becomes strong.

This is true also for the pixel arrangement that is illustrated in FIG. 2(c), or for other arrangements including the RGBW arrangement. Moreover, also in the R and G pixels other than the B pixel, there is a problem in that the number of the pixels that have the same color per unit area in the RGBW arrangement is smaller than in the RGB pixel arrangement and the compensation precision is decreased as the number of the reference pixels applicable for calculating the compensation pixel value is decreased.

[2. Example of Processing that Calculates a Compensation Pixel Value of a Color Pixel by Interpolating a W Pixel in a Pixel Position of the Color Pixel that is a Compensation Target and Applying the Interpolated W Pixel]

Next, an example of processing that calculates the compensation pixel value of the color pixel by interpolating the W pixel in a pixel position of the color pixel that is a compensation target and applying the interpolation W pixel is described as an example of the image noise reduction processing that is executed in the image processing apparatus according to the present disclosure.

As described above, for example, in the RGBW arrangements that are illustrated in FIGS. 1(a) to 1(d) or FIGS. 2(a) and 2(c), the pixel density of the R, G, and B color pixels is decreased compared to the Bayer arrangement that is configured from only the RGB pixels, which is illustrated in FIG. 1(e).

For example, in the reference areas made from 7×7 pixels, of which the centers are the attention pixels that are illustrated in FIG. 2, the number of the pixels that have the same color as the attention pixel in the center that is the compensation target is small, and the compensation precision is decreased in the compensation processing that refers to the pixels having the same color, of which the number is small.

In the image processing apparatus according to the present disclosure, the compensation pixel value of the color pixel is calculated by interpolating the W pixel at the pixel position of the color pixel that is the compensation target and applying the interpolation W pixel. An example of the processing is described below referring to FIG. 3 and subsequent figures.

A captured image (mosaic image) in FIG. 3(1) is an image that has the same arrangement as that in FIG. 2(a), and indicates an output image in the RGBW arrangement, of the imaging element. Each pixel of the output image of the imaging element is set to only the pixel value of any one of R, G, B, and W.

Moreover, such an image is called the mosaic image. Processing that assigns the pixel values of R, G, and B to each pixel position in the mosaic image is called de-mosaic processing, and for example, in a digital camera, the image in which the RGB pixel value is assigned to each pixel position by executing the de-mosaic processing is stored in a memory and is displayed on a display.

Examples in which pixel-based noise reduction processing is performed on the mosaic image that is present before the de-mosaic processing and that is illustrated in FIG. 3(1) are illustrated in FIG. 3.

The examples in FIG. 3 illustrate a case where the compensation pixel value of the compensation target pixel is calculated by setting the 7×7 pixel reference area of which the center is the pixel that is the compensation target pixel, that is, a noise reduction target. In the examples in FIG. 3, a B pixel (B0) that is the center of the 7×7 pixel reference area is set to be the compensation target pixel, and the compensation pixel value of the B pixel (B0) is calculated.

First, the pixel that has the same color as the compensation target pixel is selected from the reference area. Four pixels B1, B2, B3, and B4 that are illustrated in FIG. 3(1) are selected as the reference pixels.

For example, calculation of the following compensation pixel value (B0') is executed if the noise reduction processing in the related art is performed, that is, if the so-called smoothing processing is performed that calculates the compensation pixel value of the attention pixel by executing the addition for weighting and the like that depends on the difference in the pixel value between the attention pixel that is the compensation target pixel and the reference pixel.

$$B0'=p(B0)|B0-B0|+q(B1)|B0-B1|+r(B2)|B0-B2|+s(B3)|B0-B3|+t(B4)|B0-B4| \quad \text{(Equation a)}$$

Figure 4:
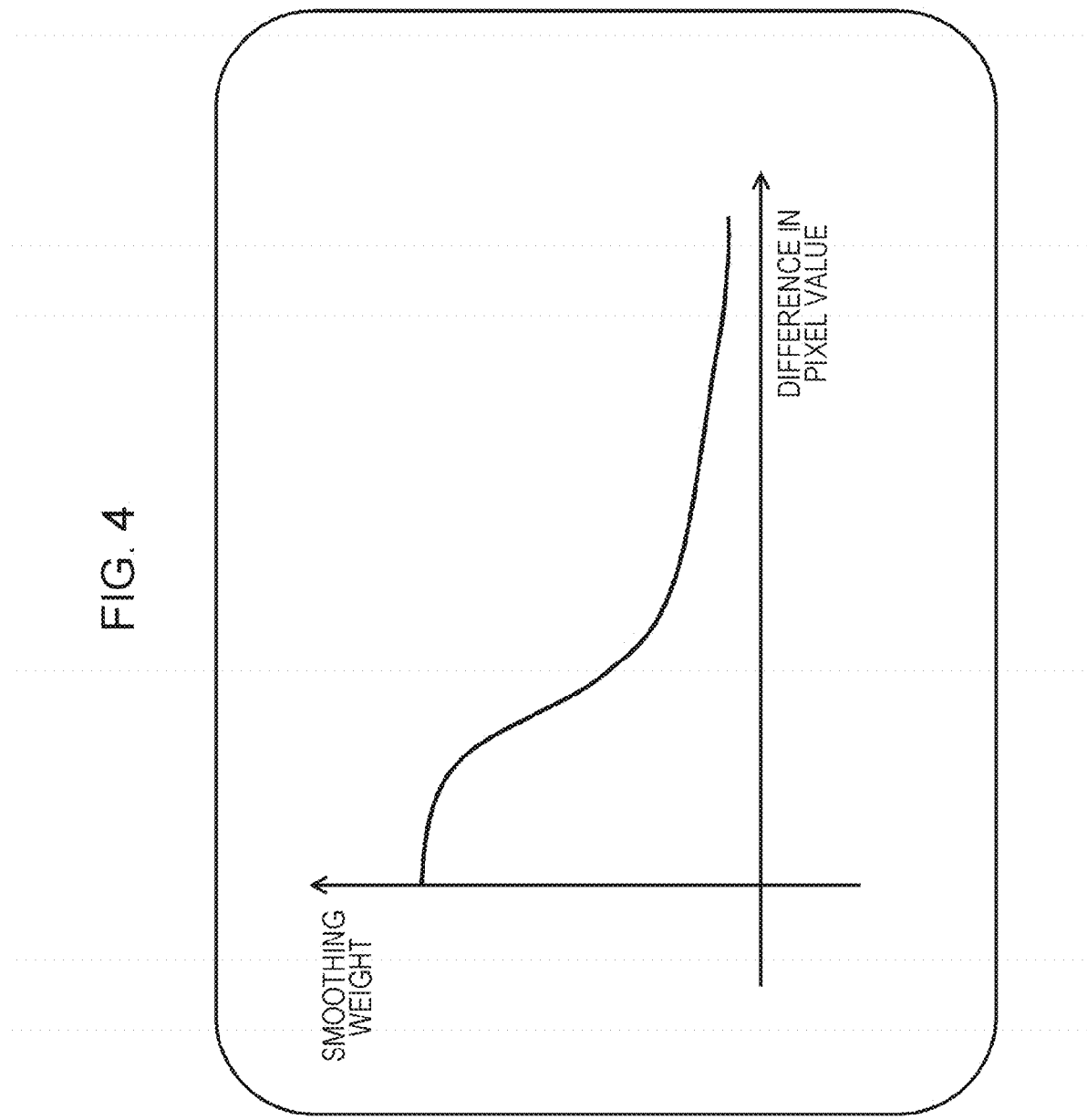
FIG. 4 is a diagram for describing a specific example of a smoothing function that is applied to the noise reduction processing that is executed in the image processing apparatus according to the present disclosure.

In (Equation a) described above, p, q, r, s, and t are weights (smoothing weights) that depend on the difference in the pixel value between the attention pixel and the reference pixel, and for example, a smoothing function that defines a curved line illustrated in FIG. 4 is stipulated in advance and p, q, r, s and t are set according to the smoothing function.

In this manner, if the noise reduction processing is performed, for example, the so-called smoothing processing is performed many times that calculates the compensation pixel value of the attention pixel by executing the addition for weighting and the like that depend on the difference in the pixel value between the attention pixel that is the compensation target pixel and the reference pixel. However, if the number of the reference pixels is small and the addition for weighting that depends on the difference in the pixel value between the attention pixel and the reference pixel, for example, when even one error pixel is included, a case occurs in which an effect of the error pixel is increased and an unnatural compensation pixel value is calculated without performing optimal smoothing.

In the noise reduction processing, that is, pixel value compensation processing, which is executed on the attention pixel by the image processing apparatus according to the present disclosure, the W pixel value of each position of the attention pixel (B0) that is the compensation target and the four reference pixels (B1 to B4) is estimated. That is, W pixel interpolation processing is performed on each pixel position of the attention pixel (B0) that is the compensation target and the four attention pixels (B1 to B4). The W pixel interpolation processing is executable by interpolation processing that sets the W pixel in the vicinity of an interpolation pixel position to be the reference pixel.

In the RGBW arrangements that are illustrated in FIG. 3, approximately half of the 7×7 pixels that are illustrated as the reference area are configured from the W pixels, and the pixel density of the W pixels is the highest. For example, the four W pixels are present, adjacently upward, downward, leftward, and rightward, in the vicinity of each of the five pixel positions of the attention pixel (B0) and the four reference pixels (B1 to B4). In each interpolation pixel position, for example, an average of the pixel values of the four W pixels is calculated, and thus the W pixel value of the interpolation W pixel is determined. Alternatively, an interpolation pixel value may be calculated with the interpolation processing in which an edge direction is considered, for example, with the addition for weighting and the like in which a large weight is assigned to the pixel in a decreasing direction of a gradient of the pixel value.

Like in an interpolation image illustrated in FIG. 3(2), interpolation W pixels B4(W0 to W5) are assigned to the pixel positions of the attention pixel (B0) that is the compensation target and the four reference pixels (B1 to B4), respectively.

The compensation pixel value that results after the reduction in noise in the attention pixel (B0) that is the compensation target is calculated by applying the W pixel value of the interpolation W pixel.

Figure 5:
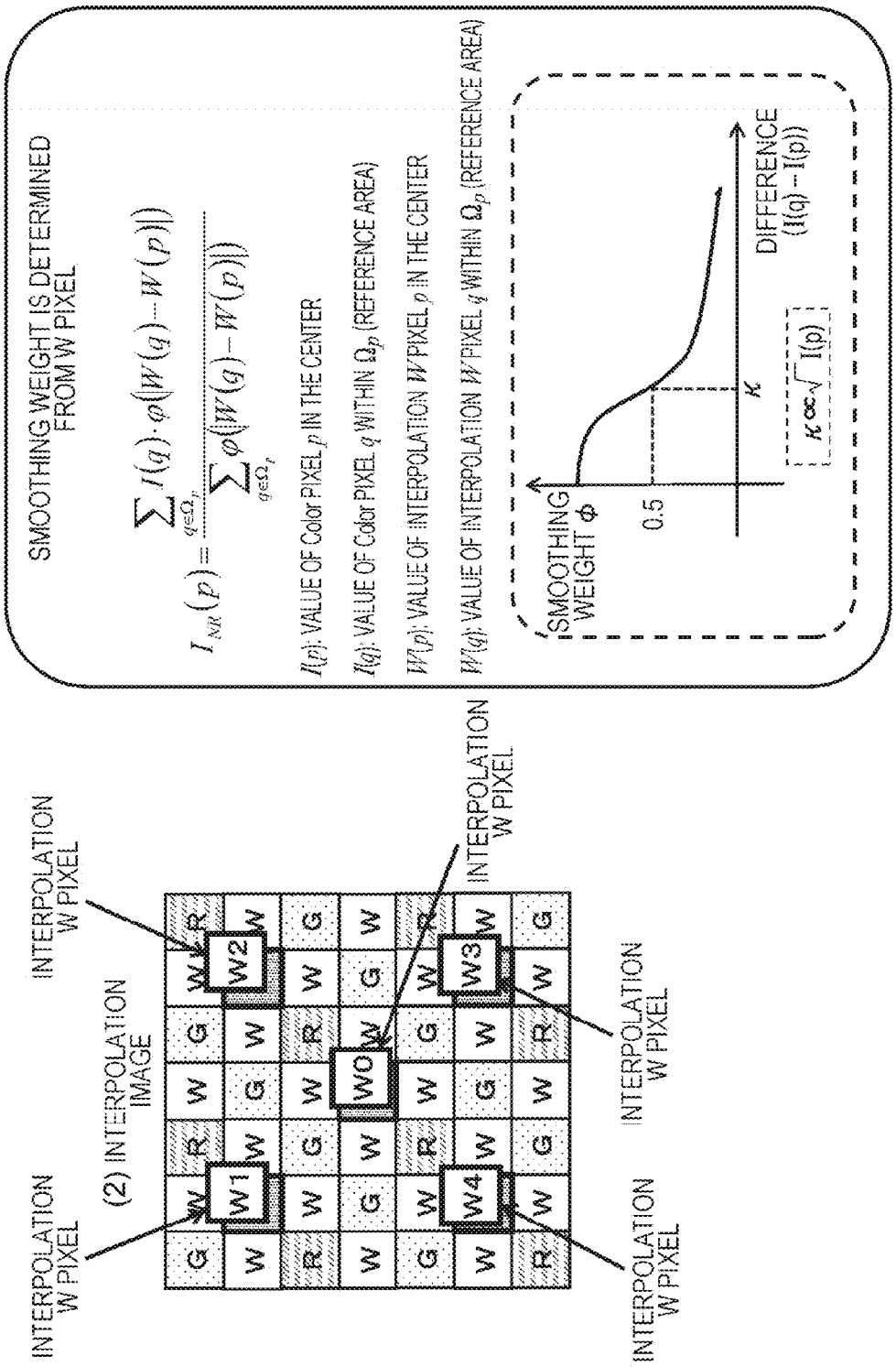
FIG. 5 is a diagram for describing a specific example of the noise reduction processing that is executed in the image processing apparatus according to the present disclosure.

Specifically, the compensation pixel value is calculated by applying smoothing strength that is calculated using the interpolated W pixel value as illustrated in FIG. 5.

For example, a compensation pixel value $I_{NR}(P)$ of the attention pixel is calculated according to (Equation 1) illustrated below.

[Formula 1]

$$I_{NR}(p) = \frac{\sum_{q \in \Omega_p} I(q) \cdot \varphi(|W(q) - W(p)|)}{\sum_{q \in \Omega_p} \varphi(|W(q) - W(p)|)} \quad \text{(Equation 1)}$$

In Equation described above, parameters indicate the following values.

$I_{NR}(p)$: the compensation pixel value (=compensation pixel value that results after the noise reduction processing) of the attention pixel $\Omega p$: the reference area of which the center is the attention pixel $I(q)$: the pixel value of the reference pixel that is the pixel which has the same color as the attention pixel within the reference area $\Omega p$ $W(p)$: the interpolation W pixel value of a position of the attention pixel $W(q)$: the interpolation W pixel value of a position of the reference pixel that has the same color as the attention pixel within the reference area $\Omega p$ $\varphi$: the smoothing function The compensation pixel value of the attention pixel that is the center of the reference area is calculated according to (Equation 1) described above. From (Equation 1) described above, the compensation pixel value of the attention pixel is calculated by determining the smoothing weight using the interpolation W pixel value of the position of the reference pixel.

The $\varphi$: smoothing function is the same function as described above referring to FIG. 4, and is a function that assigns the weight that depends on the difference between the attention pixel and the reference pixel. Moreover, in the processing example, the $\varphi$: smoothing function is defined as a function that calculates the weight that depends on the difference between the W pixel value of the interpolation W pixel that corresponds to the position of the attention pixel and the W pixel value of the interpolation W pixel that corresponds to the position of the reference pixel.

In this manner, for example, the number of the B pixels that is included in the 7×7 pixel reference area is small, but the number of W pixels that are included in the 7×7 pixel reference area is large, and the noise reduction processing is possible with greater precision by using the B pixel, as is, as the reference pixel, thus determining the smoothing weight using the interpolation W pixel, and thus calculating the interpolation pixel value.

Particularly, because a strong relationship between the W pixel and the color pixel of each of the R, G, and B is present that results from spectral characteristics of a color filter, this produces an effective result. Furthermore, because the W pixel is high in sensitivity, noise is decreased, and it is possible to determine the appropriate smoothing weight that depends on an edge or a texture. Moreover, because there is no relationship between noise staying on the W pixel and noise staying on the color pixel, there is also an advantage in that a change in a signal level is suppressed without relying on the pixel value on which smoothing is performed directly with the smoothing strength, by calculating the smoothing strength from the W pixel.

Moreover, the processing example that is described referring to FIGS. 3 to 5 is a processing example in which the compensation pixel value of the B pixel is calculated with the attention pixel as the B pixel, but the same processing is performed also on the R and G that are color pixels other than the B pixel.

That is, the compensation pixel value is calculated that reduces the noise by setting the reference area (for example, the 7×7 pixels) of which the center is any color pixel of the R, G, and B color pixels, which is the compensation target, interpolating the W pixel at the positions of the attention pixel and the reference pixel, and applying (Equation 1) described above.

Moreover, the reference area is not limited to the 7×7 pixels, and it is possible to set variously-sized areas other than the 7×7 pixel area.

Figure 6:
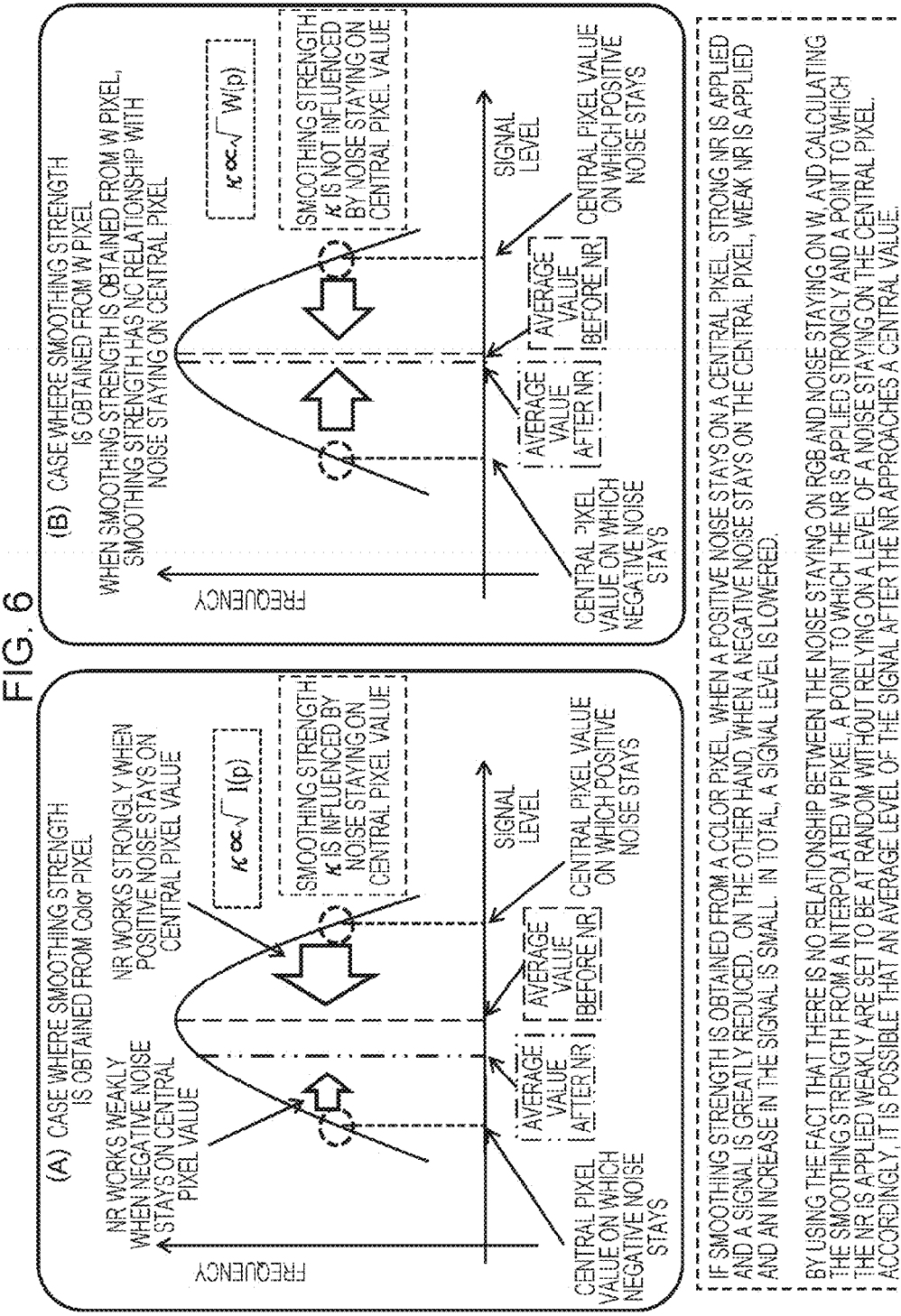
FIG. 6 is a diagram for describing a merit of obtaining smoothing strength using a W pixel.

In the present processing example, the compensation pixel value that is the noise reduction pixel value of the attention pixel is calculated according to (Equation 1) described above, but in the noise reduction (NR) processing, a merit of obtaining the smoothing strength using the W pixel is described referring to FIG. 6.

FIG. 6 illustrates subsequent processing examples.

(A) An example in which the signal level changes when the noise reduction (NR) processing is executed if the smoothing strength is calculated from the color pixel (B) An example in which the signal level changes when the noise reduction (NR) processing is executed if the smoothing strength is calculated from the interpolation W pixel That is, FIG. 6(A) illustrates the processing that, when described with the pixel value compensation of a B0 pixel being illustrated in FIG. 3 as an example, calculates the compensation pixel value (B0') according to (Equation a) described above, that is, (Equation b) described below.

$B0'=p(B0)|B0=B0|+q(B1)|B0-B1|+r(B2)|B0-B2|+s(B3)|B0-B3|+t(B4)|B0-B4|$    (Equation b)

On the other hand, FIG. 6(B) is equivalent to processing that calculates the compensation pixel value according to (Equation 1) described above.

As illustrated in FIG. 6(A), if the smoothing strength is obtained from the color image itself, when positive noise stays on the central pixel that is the compensation target, strong compensation (NR) is applied and the signal is greatly decreased. On the other hand, if negative noise stays, weak compensation (NR) is applied, and an increase in the signal is small. In total, the signal level is lowered.

On the other hand, as illustrated in FIG. 6(B), by obtaining the smoothing strength from the interpolation W pixel, it is possible to apply the compensation (NR) to almost the same extent not only in a case where the positive noise stays on the central pixel that is the compensation object but also in a case where the negative noise is applied, and In total, the compensation that decreases the change in the signal level is possible.

In the configuration according to the present disclosure, a dot to which the compensation (NR) is applied strongly and a dot to which the compensation (NR) is applied weakly are set to be at random without relying on the level of noise staying on the central pixel, by using the fact that there is no relationship between the noise staying on the RGB and the noise staying on the W and by calculating the smoothing strength from the interpolated W pixel. Accordingly, it is possible that an average level of the signal that results after the compensation (NR) approaches a central value.

In this manner, in the configuration in which the smoothing weight is assigned by interpolating the W pixel at the position of each color pixel of the R, G, and B and using the interpolation W pixel value, one problem is when the W pixel is saturated. There is a high likelihood that the pixel that has the saturation pixel value will not reflect the correct pixel value, and it is preferable that the compensation in which the saturation pixel is set to be the reference pixel not be performed.

A countermeasure against the W pixel being saturated is described below referring to FIG. 7.

The W pixel is interpolated at the positions of the attention pixel and the reference pixel by setting the reference area (for example, the 7×7 pixels) of which the center is any color pixel of the R, G, and B color pixels, which is the compensation target.

The processing described so far is the same as that described above referring to FIGS. 3 to 5.

Figure 7:
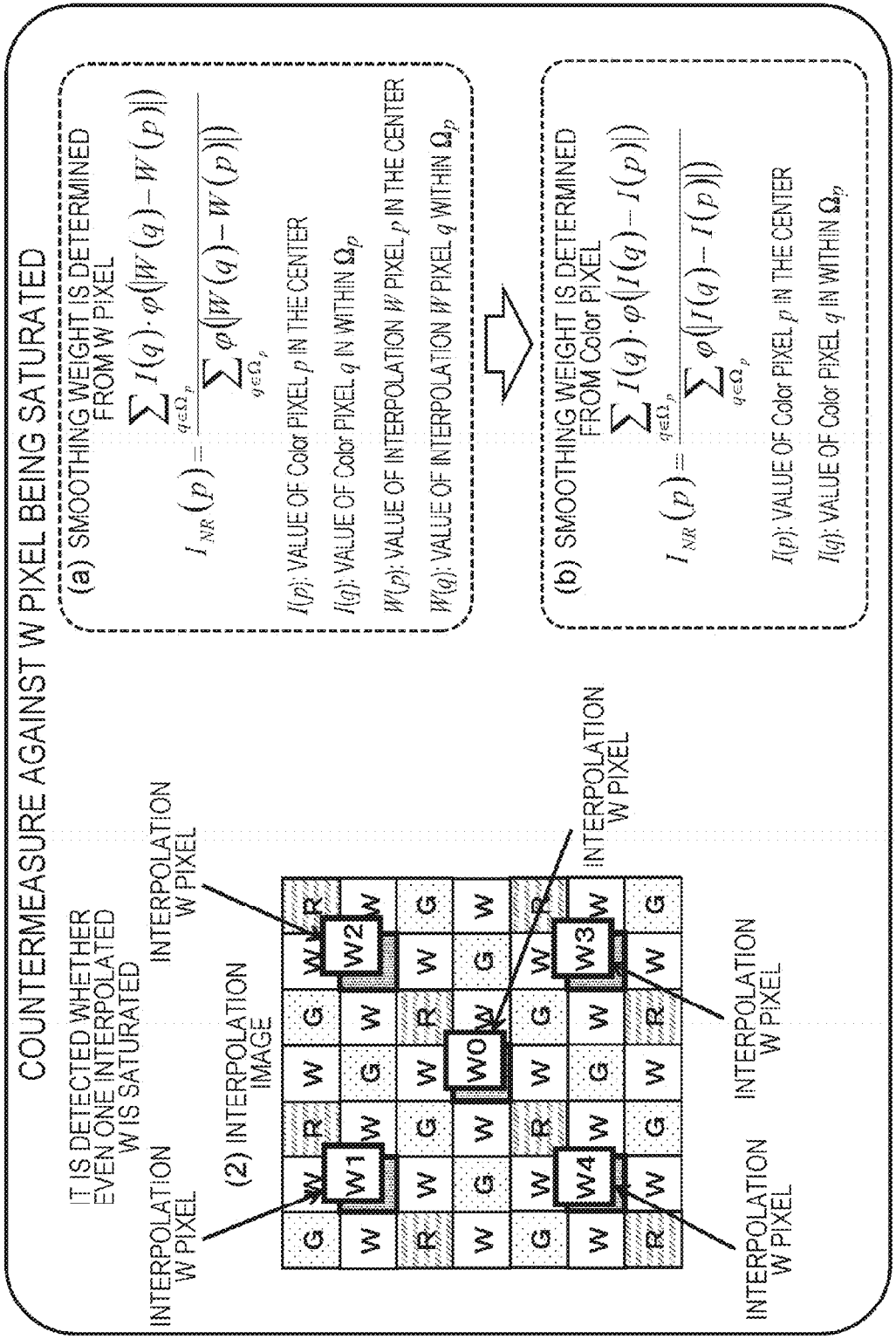
FIG. 7 is a diagram for describing a countermeasure against the W pixel being saturated in the noise reduction processing that is executed in the image processing apparatus according to the present disclosure.

As illustrated in FIG. 7, the interpolation pixel W0 is assigned to the position of the attention pixel that is the compensation target in the center of the reference area, and the four interpolation W pixels W1 to W4 are assigned to the 7×7 pixel reference area in the vicinity of the attention pixel.

Next, a saturation processing that determines whether or not any one of the interpolation W pixels is saturated is performed.

If any one of the interpolation W pixels is a maximum pixel value, it is determined that such an interpolation W pixel is saturated.

If none of the interpolation W pixels W0 to W4 are the saturation pixels, as illustrated in FIG. 7(a), according to (Equation 1) described above, compensation (NR) processing is executed by applying the smoothing weight that is calculated by applying the interpolation W pixel without applying the interpolation W pixels, and thus by calculating the compensation pixel value of the attention pixel.

On the other hand, if even one saturation pixel is included in the interpolation W pixels W0 to W4, as illustrated in FIG. 7(b), according to (Equation 2) described below, the compensation (NR) processing is executed by applying the smoothing weight based on the difference between the attention pixel and the reference pixel that has the same color as the attention pixel without applying the interpolation W pixel, and thus by calculating the interpolation value of the attention pixel.

[Formula 2]

$$I_{NR}(p) = \frac{\sum_{q \in \Omega_p} I(q) \cdot \varphi(|I(q) - I(p)|)}{\sum_{q \in \Omega_p} \varphi(|I(q) - I(p)|)}$$ (Equation 2)

In Equation described above, parameters indicate the following values.

$I_{NR}(p)$: the compensation pixel value (=compensation pixel value that results after the noise reduction processing) of the attention pixel $\Omega p$: the reference area of which the center is the attention pixel $I(q)$: the pixel value of the reference pixel that is the pixel which has the same color as the attention pixel within the reference area $\Omega p$ $\varphi$: the smoothing function In this manner, (a) if the pixel value of the interpolation W pixel is not saturated, the compensation (NR) processing is executed by applying the smoothing weight that is calculated by applying the interpolation W pixel, and thus by calculating the interpolation pixel value of the attention pixel.

(b) If the pixel value of the interpolation W pixel is saturated, the compensation (NR) processing is executed by applying the smoothing weight that is calculated by applying the original color pixel, not the interpolation W pixel, and thus by calculating the interpolation pixel value of the attention pixel.

In this manner, the two processing operations, the (a) processing and the (b) processing, are exchangeably executed depending on whether or not the interpolation W pixel is saturated.

By performing such processing, the compensation based on the saturated interpolation W pixel can be avoided and the high-precision compensation (NR) processing can be executed.

The noise reduction (NR) processing described above is processing that uses a two-dimensional (2D) plane on which the reference area is set to be the 7×7 pixels, but if the processing that uses the two-dimensional plane is performed, it is necessary to retain at least a two-dimensional (2D) image for the reference area in the memory.

The image values from the imaging element are sequentially output line by line in a horizontal direction (x-direction). That is, the image values from the imaging element are sequentially input, as one-dimensional (1D) data, into the signal processing unit.

If the processing that uses the two-dimensional (2D) plane on which the reference area described above is set to be the 7×7 pixels is performed, there occurs a problem in that it is necessary to retain data for at least 7 lines, a high-capacity memory is necessary, and for example, cost of a camera and the like are increased.

In order to avoid the use of the high-capacity memory, a configuration may be possible in which using one-dimensional (1D) data line by line, the assigning of the interpolation W pixel described above is performed and the pixel value compensation as the noise reduction processing is performed. Moreover, thereafter, for example, a configuration is also possible in which the compensation that refers to the pixel in the vertical direction is performed using an infinite impulse response (IIR) filter. Moreover, the IIR filter is for filter processing that is performed on the signal that is input in a time-series, as processing that refers to only a current signal and an earlier signal, and makes it possible to omit a memory that retains all the reference pixel values.

Figure 8:
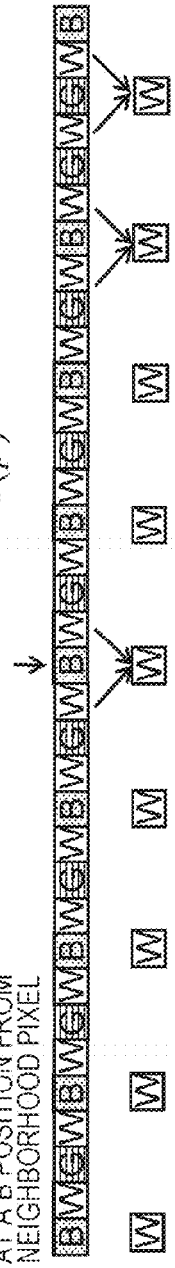
FIG. 8 is a diagram for describing an example of processing that has to be executed if assigning of and compensation of an interpolation W pixel are executed using one-dimensional (1D) data line by line.

FIG. 8 is a diagram for describing a processing example in which the assigning and the compensation of the interpolation W pixel described above are executed using the one-dimensional (1D) data line by line.

Data illustrated in FIG. 8(1) is equivalent to pixel data in the horizontal line that is output from the imaging element.

At this point, the attention pixel that is set to be the noise reduction processing target is set to be the B pixel in the center portion illustrated in FIG. 8(1), which is an NR processing pixel. The pixel value of the NR processing pixel is I(p).

The interpolation W pixel is assigned to positions of the NR processing pixel and the B pixel that are included in the line.

The pixel value of the interpolation W pixel may be determined by applying the pixel value of the adjacent W pixel, such as an average value of the two W pixels that are adjacent to each B pixel.

After the interpolation W pixel assignment processing, the calculation of the compensation pixel value according to (Equation 1) described above is executed.

However, if the pixel value of the interpolation W pixel is saturated, the calculation of the compensation pixel value according to (Equation 2) described above is executed without using the interpolation W pixel.

By performing such processing, the noise reduction processing with a larger number of TAPs is realized at a low cost.

Figure 9:
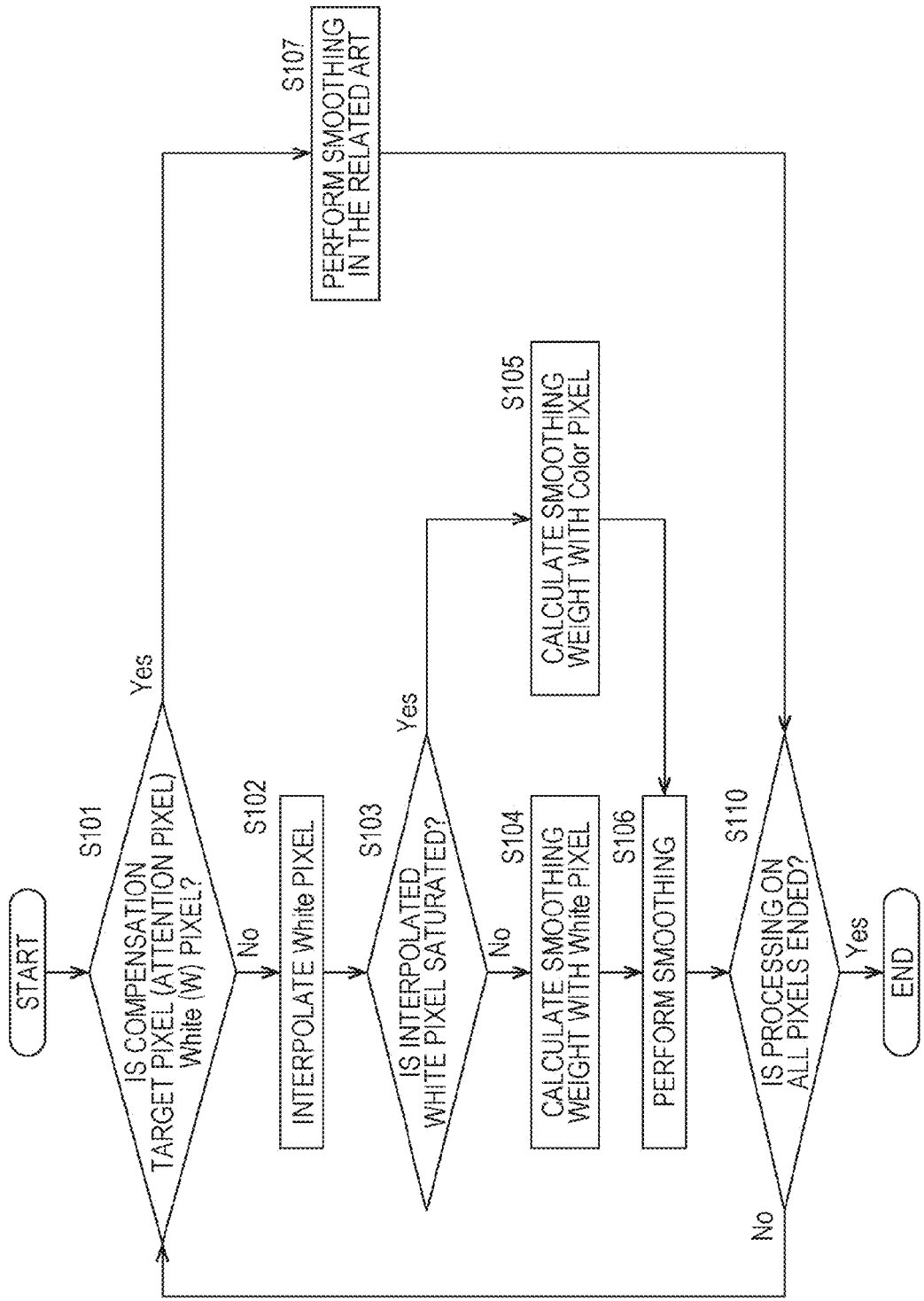
FIG. 9 is a diagram illustrating a flow chart for describing a detailed sequence for the noise reduction processing that is executed in the image processing apparatus according to the present disclosure.

A processing sequence of the noise reduction (NR) processing that is executed in the image processing apparatus according to the present disclosure is described referring to a flow chart that is illustrated in FIG. 9.

The flow chart that is illustrated in FIG. 9 illustrates processing that is executed in a signal processing unit that executes signal processing by inputting a captured-image signal from the imaging element, for example, in the image processing apparatus such as the digital camera. For example, the processing is executed in a data processing unit, such as a CPU within the signal processing unit that has a function of executing a program according to the program recorded in the signal processing sequence that is illustrated in FIG. 9.

The signal processing unit selects the pixel signals of RGBW that are input from the imaging element, sequentially one by one as the compensation target, and thus performs the processing.

First, in Step S101, it is determined whether or not the compensation target pixel (attention pixel) is a White (W) pixel.

If the compensation target pixel (attention pixel) is the White (W) pixel, proceeding to Step S107 takes place.

If the compensation target pixel (attention pixel) is not the White (W) pixel, that is, if the compensation target pixel (attention pixel) is any color pixel of the R, G, and B, proceeding to Step S102 takes place.

If the compensation target pixel (attention pixel) is the White (W) pixel, proceeding to Step S107 takes place, the smoothing processing in the related art is executed, the interpolation pixel value of the W pixel that is the interpolation target element (attention pixel) is calculated, and thus the compensation target pixel is set to be the noise reduction pixel.

In the RGBW arrangement, because the W pixel is high in pixel density, even though only the W pixel is selected as the reference pixel, the pixel value of the reference pixel that is made from only the W pixel is used, the smoothing weight is assigned, and thus the interpolation pixel value is calculated, there is a low likelihood that the compensation precision will be decreased.

On the other hand, if the compensation target pixel (attention pixel) is not the white (W), that is, if the compensation target pixel is any color pixel of the R, G, and B, proceeding to Step S102 takes place.

In Step S102, the W pixel interpolation processing is executed that assigns the W pixel to a position of the reference pixel which has the same color as the attention pixel that is in the reference pixel area of which the center is the attention pixel.

Such processing is the W pixel interpolation processing that is described above referring to FIGS. 3 and 5.

Next, in Step S103, it is determined whether or not even one saturation pixel is present in the interpolation W pixel.

If it is confirmed that even one saturation pixel is present in the interpolation W pixel, proceeding to Step S105 takes place.

If it is confirmed that not even one saturation pixel is present in the interpolation W pixel, proceeding to Step S104 takes place.

When it is confirmed that not even one saturation pixel is present in the interpolation W pixel and proceeding to Step S104 takes place, the processing that calculates the interpolation pixel value according to (Equation 1) described above is performed in Step S104 and S106. That is, the pixel value of the attention pixel is calculated according to (Equation 1), using the smoothing weight to which the pixel value of the interpolation W pixel is applied. The interpolation pixel value is set to be the pixel value of the attention pixel that results after the noise reduction.

On the other hand, if it is confirmed that one or more saturation pixels are present in the interpolation W pixel, in Steps S105 and S106, the processing that calculates the interpolation pixel value according to (Equation 2) described above is performed. That is, the pixel value of the attention pixel is calculated according to (Equation 2), by calculating the smoothing weight to which the pixel values of the attention pixel and of the reference pixel which has the same color as the attention pixel are applied. The interpolation pixel value is set to be the pixel value of the attention pixel that results after the noise reduction.

In Step S106, when the calculation of the compensation pixel value to which (Equation 1) or (Equation 2) is applied is ended, proceeding to Step S110 takes place.

In Step S110, it is determined whether or not the calculation of the interpolation pixel value for all the pixels that make up the image is ended. If a non-processed pixel is present, returning to Step S101 takes place, processing in Step S101 and later is performed on the non-processed pixel, and thus compensation pixel value calculation processing is performed on the non-processed pixel.

In Step S110, when it is determined that the processing on all the pixels is ended, the processing is ended.

[3. Example of Processing that Performs Defect Compensation According to a Result of Texture Detection to which the W Pixel is Applied in Compensation Processing of the Color Pixel that is a Defect Compensation Target]

Next, as an example of processing that compensates a defective pixel that is included in the image, which is executed in the image processing apparatus according to the present disclosure, an example of processing is described in which texture detection to which the W pixel in the neighborhood of the pixel position of the color pixel that is the compensation target is applied is performed, it is determined whether or not the compensation processing is executed according to the result of the texture detection, and thus the compensation is performed.

First, as described in FIGS. 1 and 2, since a distance between the color pixels in the RGBW arrangement that includes the white (W) pixel is greater than in the Bayer arrangement in the related art, there is a problem in that the defect compensation is difficult to execute.

Particularly, if the defect compensation processing to which the one-dimensional (1D) pixel data is applied is performed as first described above in FIG. 8 in order to cut down on a hardware (HW) cost, because the distance between the pixels is greater, such a problem is pronounced.

Moreover, the defect compensation processing to which the one-dimensional (1D) pixel data is applied is, for example, processing that selects as the reference pixel the neighborhood pixel that has the same color as the pixel (attention pixel) that is the compensation target, applies the pixel value of the reference pixel, and thus calculates the pixel value of the compensation pixel.

In this case, if the number of the pixels that have the same color and that are present in the neighborhood of the compensation target pixel is large, higher-precision compensation is possible. However, if the number of the pixels that have the same color and that are available for reference in the neighborhood of the compensation target pixel is small, the precision of the defect compensation is decreased. Particularly, if the texture, such as a pattern of a photographic subject that is included in the captured image, is present, when damaged pixels are scattered, it is difficult to determine whether the defect or the texture is present and the high-precision defect compensation is extremely difficult to execute.

Figure 10:
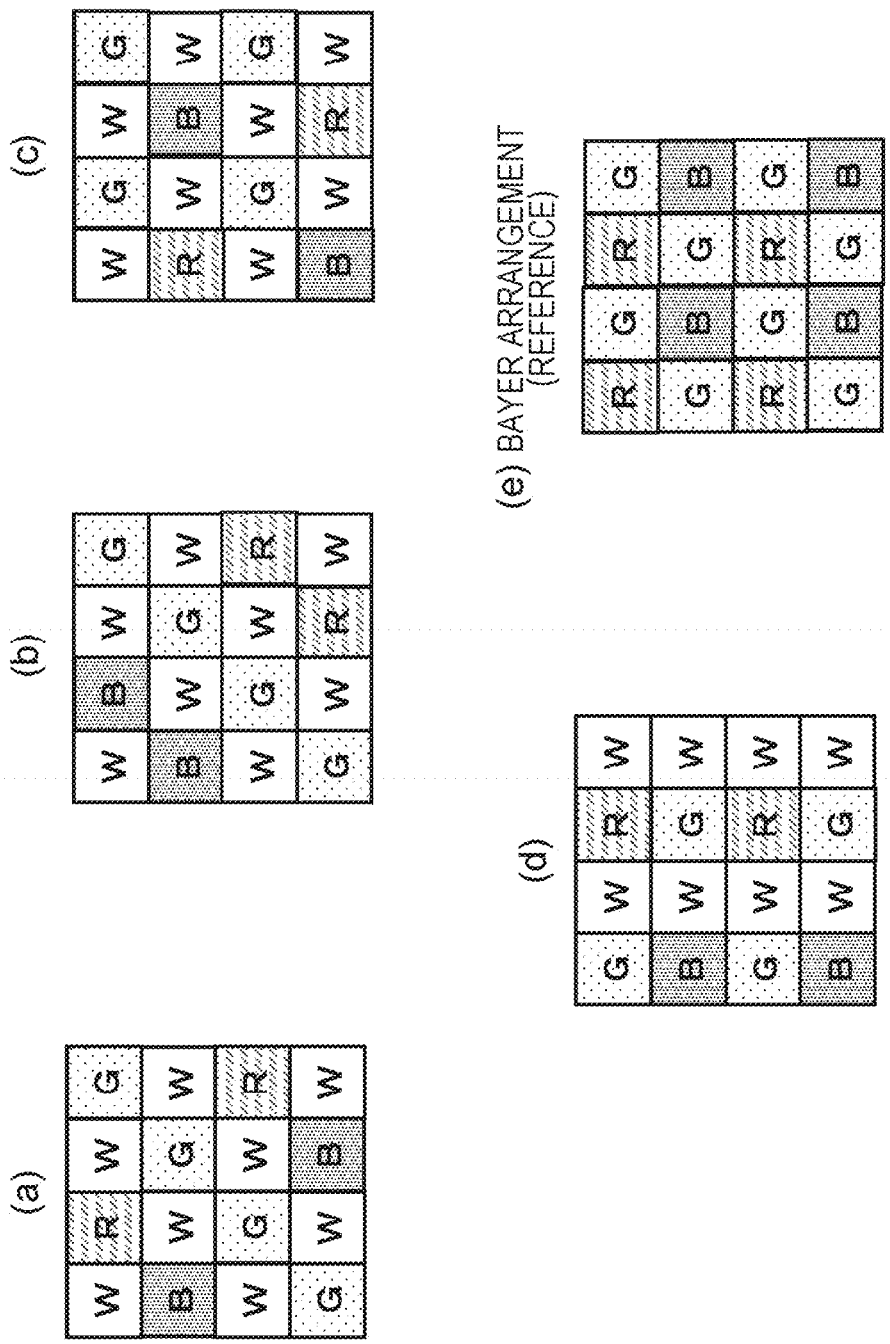
FIG. 10 is a diagram for describing an example of an RGBW arrangement.

For example, as illustrated in FIG. 10, in the RGBW arrangements that are illustrated in FIGS. 10(a) to 10(d), when viewed from the horizontal direction, whereas one W pixel out of every two pixels is present in all the arrangements, one R pixel and one B pixel out of every four pixels are present in all the arrangements and only one G pixel out of every four pixels is present in the arrangements other than the arrangement in FIG. 10(c).

Because the greater the distance between the pixels that have the same color, the more difficult it is to separate the texture and the defect, in the related art, a technique of the one-dimensional defect compensation that is performed many times cannot be applied as is.

An example of processing is described below that executes analysis processing that uses the white (W) pixel adjacent to the compensation target pixel (attention pixel), determines whether the defect or the texture is present, and thus executes the defect compensation if it is determined that the defect is present.

First, an outline of the defect compensation processing according to the present disclosure is described referring to FIG. 11.

In a sensor that has been used in recent years, the pixel density is high, and it is observed that one bright dot on an actual scene in image capture processing extends over two or more pixels due to characteristics of an optical system. As illustrated in FIG. 11(1), it is observed that one bright dot, for example, extends not only over the central color pixel G, but also over the adjacent W pixel. On the other hand, because optical characteristics do not have an influence on a pixel defect, the signal level goes up and down greatly in one pixel alone.

Moreover, as illustrated in FIG. 11(2), because the white (W) pixel has characteristics that allow all-wavelength visible light to pass through, for example, if the signal level of the color pixel (G) that is the compensation target pixel (attention pixel) in the center of the reference area goes up due to the influence of the bright dot, the signal level of the adjacent white (W) pixel goes up.

However, if the pixel level of the color pixel (G) that is the compensation target pixel (attention pixel) goes up due to the defect, the pixel level of the adjacent W pixel is comparatively lower compared to the G pixel.

In other words, by performing the analysis processing that uses the white (W) pixel that is adjacent to the compensation target pixel (attention pixel), the determination of whether the defect is present or the texture according to the captured image is present is effective.

Next, an example of detection processing of the general pixel defect is described referring to FIGS. 12 and 13.

First, an example 1 of the detect detection processing is described referring to FIG. 12.

The example of the defect detection processing that is illustrated in FIG. 12 is an example of the defect detection processing that uses the same one-dimensional (1D) pixel line data as described above referring to FIG. 8.

It is determined whether or not the compensation target pixel (attention pixel) G(x) in the center of the pixel line in FIG. 12 is the defective pixel.

In such processing, the pixel value of the neighborhood G pixel that has the same color as G(x) is obtained.

In the example on the drawings, the pixel value of each G pixel of G(x+8), G(x+4), G(x), G(x−4), and G(x−8) is obtained.

Moreover, a maximum value (max) and a minimum value (min) among the pixel values of the five G pixels are determined.

If G(x) is the maximum (max), it is determined that there is a likelihood that the G(x) pixel will have a white dot defect, and if G(x) is the minimum (min), it is determined that the G(x) pixel will have a black dot defect.

The white dot defect is a defect that results in outputting the greater pixel value than the normal pixel value, and the black dot defect is a defect that results in outputting the smaller pixel value than the normal pixel value.

Next, an example 2 of the detect detection processing is described referring to FIG. 13.

The example of the defect detection processing that is illustrated in FIG. 13 is processing that determines whether or not the compensation target pixel (attention pixel) G(x) is the defective pixel by comparing (a) the pixel value of the compensation target pixel (attention pixel) G(x) and (b) the estimation pixel value of the position of the compensation target pixel (attention pixel) G(x) that is estimated from the pixel adjacent to the compensation target pixel (attention pixel) G(x).

Also in such processing, first, the pixel value of the neighborhood G pixel that has the same color as G(x) is first obtained in the same manner as in the example 1 of the processing described above.

In the example in the drawings, the pixel value of each G pixel of G(x+8), G(x+4), G(x), G(x−4), and G(x−8) is obtained.

Moreover, an estimation pixel value GI(x) of the position of the compensation target pixel (attention pixel) G(x) that is estimated from the two G pixels on the left side of G(x), that is, G(x−4) and G(x−8) is calculated according to Equation described below.

$$GI(x)=G(x-4)+\{G(x-4)-G(x-8)\}$$

In the same manner, an estimation pixel value Gr(x) of the position of the compensation target pixel (attention pixel) G(x) that is estimated from the two G pixels on the right side of G(x), that is, G(x+4) and G(x+8) is calculated according to Equation described below.

$$Gr(x)=G(x+4)+\{G(x+4)-G(x+8)\}$$

The two estimation pixel values, that is, Gl(x) and Gr(x), and the pixel value G(x) of the actual compensation target pixel (attention pixel) are compared.

If G(x) is greater than the maximum value (max) among the two estimation pixel values, that is, Gl(x) and Gr(x), it is determined that there is a likelihood that a G(x) pixel will have the white dot defect, and if G(x) is smaller than the minimum value (min) among the two estimation pixel values, that is, Gl(x) and Gr(x), it is determined that there is a likelihood that a G(x) pixel will have the black dot defect.

The white dot defect is a defect that results in outputting the greater pixel value than the normal pixel value, and the black dot defect is a defect that results in outputting the smaller pixel value than the normal pixel value.

The defect detection of the pixel, for example, is executed according to the processing described referring to FIGS. 12 and 13. Moreover, in addition, there is a variety of defect detection processing, and in the configuration according to the present disclosure, it is possible to apply the variety of defect detection processing.

Next, one example of processing that detects the texture from the image, which is performed in the image processing apparatus according to the present disclosure, is described referring to FIG. 14.

FIG. 14 illustrates (1) an example of assigning the pixel for the texture detection and (2) a texture detection sequence.

(1) The example of assigning the pixel for the texture detection is an example of using the one-dimensional (1D) pixel data, that is, the pixel data in one line in the same manner as described above referring to FIG. 8.

The compensation target pixel (attention pixel) that is the target for determining the presence and absence of the texture is set to be G(x) that is illustrated in FIG. 14(1).

The pixel value of the W pixel in the neighborhood of the attention pixel G(x) is obtained.

In an example that is illustrated in FIG. 14(1), the pixel values of the four neighborhood W pixels, that is, W(x−3), W(x−1), W(x+1), and W(x+3) are obtained.

For example, like in a graph that is illustrated in FIG. 14(1), the signal level of each pixel that corresponds to each coordinate position is obtained.

FIG. 14(2) illustrates processing that determines whether or not there is a convex texture, that is, a texture in which the signal level of the attention pixel G(x) is higher than that of the adjacent pixels.

Because the pixel values of the multiple adjacent pixels, as described above referring to FIG. 11, are influenced according to one bright dot, in a case of the convex texture, it may be considered that the level of the adjacent W pixel also goes up.

Therefore, first, the maximum value of the W pixels adjacent to the attention pixel G(x) is calculated according to (Equation 3) described below.

$$\text{Max}(W(x-1), W(x+1)) \quad \text{(Equation 3)}$$

Next, the minimum value of the two W pixels outside of the adjacent W pixel described above is calculated according to (Equation 4) described below.

$$\text{Min}(W(x-3), W(x+3)) \quad \text{(Equation 4)}$$

Next, a difference is calculated between the maximum value of the W pixels adjacent to the attention pixel G(x), which is calculated according to (Equation 3) described above, and the minimum value of the W pixels outside of the attention pixel G(x), which is calculated according to (Equation 4), and thus is compared with a predetermined threshold (Th).

If the difference is greater than the threshold (Th), it is determined that the attention pixel G(x) is in the texture (convex texture).

If the difference is not greater than the threshold, it is determined that the attention pixel G(x) is not in the texture (convex texture).

That is, if $$(\text{Max}(W(x-1),W(x+1))-\text{Min}(W(x-3),W(x+3))>Th) \quad \text{(Equation 5)}$$

If (Equation 5) described above is valid, it is determined that the attention pixel G(x) is in the texture (convex texture).

If (Equation 5) described above is not valid, it is determined that the attention pixel G(x) is not in the texture (convex texture).

FIG. 14 (2) illustrates processing that determines whether or not the convex texture, that is, the texture in which the signal level of the attention pixel G(x) is higher than that of the adjacent pixels, but in FIG. 14(2), processing is also executed that determines whether or not there is a concave texture, that is, the texture in which the signal level of the attention pixel G(x) is lower than that of the adjacent pixels.

In concave texture determination processing, first, the minimum value of the W pixels adjacent to the attention pixel G(x) is calculated according to (Equation 3) described below.

$$\text{Min}(W(x-1), W(x+1)) \quad \text{(Equation 6)}$$

Next, the maximum value of the two W pixels outside of the adjacent W pixels described above is calculated according to (Equation 7).

$$\text{Max}(W(x-3), W(x+3)) \quad \text{(Equation 7)}$$

Next, a difference is calculated between the minimum value of the W pixels adjacent to the attention pixel G(x), which is calculated according to (Equation 6) described above, and the maximum value of the W pixels outside of the attention pixel G(x), which is calculated according to (Equation 7), and thus is compared with a predetermined threshold (Th).

If the difference is greater than the threshold (Th), it is determined that the attention pixel G(x) is in the texture (concave texture).

If the difference is not greater than the threshold, it is determined that the attention pixel G(x) is not in the texture (concave texture).

That is, if $$(\text{Max}(W(x-3),W(x+3))-\text{Min}(W(x-1),W(x+1))>Th) \quad \text{(Equation 8)}$$

If (Equation 8) described above is valid, it is determined that the attention pixel G(x) is in the texture (concave texture).

If (Equation 8) described above is not valid, it is determined that the attention pixel G(x) is not in the texture (concave texture).

In this manner, the image processing apparatus according to the present disclosure performs the texture determination processing to which the W pixel is applied. If the processing that determines the likelihood of the defect, which is described referring to FIGS. 12 and 13, is executed, and furthermore it is determined that there is a likelihood that the defect will be present, the texture determination processing described referring to FIG. 14 is performed. If it is determined that the pixel determined as having the likelihood of the defect is in the texture, the pixel value, as is, is output as the effective pixel value without determining that the defect is not present and thus executing the pixel value compensation as the defect compensation.

A processing sequence for the defect compensation processing that is executed in the image processing apparatus according to the present disclosure is described referring to FIG. 15.

The flow chart that is illustrated in FIG. 15 illustrates processing that is executed in a signal processing unit that executes signal processing by inputting a captured-image signal from the imaging element, for example, in the image processing apparatus such as the digital camera. For example, the processing is executed in a data processing unit, such as a CPU within the signal processing unit that has a function of executing a program according to the program recorded in the signal processing sequence that is illustrated in FIG. 15.

The signal processing unit selects the pixel signals of RGBW that are input from the imaging element, sequentially one by one as the compensation target, and thus performs the processing.

First, in Step S201, it is determined whether or not the compensation target pixel (attention pixel) is the white (W) pixel.

If the compensation target pixel (attention pixel) is the white (W) pixel, proceeding to Step S207 takes place.

If the compensation target pixel (attention pixel) is not the White (W) pixel, that is, if the compensation target pixel (attention pixel) is any color pixel of the R, G, and B, proceeding to Step 202 takes place.

If the compensation target pixel (attention pixel) is the white (W) pixel, proceeding to Step S207 takes place, and the defect compensation processing in the related art is executed. In Step S207, it is determined whether there is a likelihood that the pixel will be defective, and if it is determined that the defective pixel is present, the compensation pixel value of the W pixel that is the compensation target pixel (attention pixel) is calculated. Then, the compensation pixel value is set to be an output pixel. Moreover, because the pixel density of the W pixels is high in the RGBW arrangement, even though the compensation value is calculated by selecting only the W pixel as the reference pixel and thus using the pixel value of the reference pixel that is made from only the W pixel, there is a low likelihood that the compensation precision will be decreased.

On the other hand, if the compensation target pixel (attention pixel) is not the white (W) pixel, that is, if the compensation target pixel (attention pixel) is any color pixel of the R, G, and B, proceeding to Step S202 takes place.

In Step S202, it is determined whether there is a likelihood that the attention pixel that is any color pixel of the R, G, and B will be the defective pixel.

Such processing is executed by applying, for example, the defect detection processing that is described above referring to FIGS. 12 and 13.

In Step S203, if it is determined that there is a likelihood that the attention pixel which is any color pixel for the R, G, and B will be the defective pixel, proceeding to Step S204 takes place.

On the other hand, in Step S203, if it is determined that there is no likelihood that the attention pixel which is any color pixel for the R, G, and B will be the defective pixel, proceeding to Step S210 takes place without performing the defect compensation on the attention pixel.

In Step S203, if it is determined that there is a likelihood that the attention pixel which is any color pixel for the R, G, and B will be the defective pixel, in Step S204, furthermore, the texture determination processing is performed that determines whether or not the attention pixel is in a texture area.

The texture determination processing is executed by applying the W pixel in the neighborhood of the attention pixel. That is, the texture determination processing described above referring to FIG. 14 is executed.

In Step S205, if it is determined that the attention pixel is in the texture area, proceeding to Step S210 takes place without performing the defect compensation processing on the attention pixel.

On the other hand, in Step S205, if it is determined that the attention pixel is not in the texture area, it is determined that the attention pixel is the defective pixel, and in Step S206, the defect compensation processing is executed.

Moreover, the defect compensation processing, for example, performs the following processing.

If there is a likelihood that the attention pixel will be the white dot, and the attention pixel is not the convex texture, for example, any processing of the following defect compensation (a) and (b) is performed.

(a) Among the pixel values of the four pixels in the neighborhood of the attention pixel, which have the same color, the second pixel value (2nd_max) in the increasing order of the pixel value is set to be the compensation pixel value of the attention pixel.

(b) The maximum value, among a first estimation pixel value from the pixel value of the left-side pixel that has the same color as the attention pixel, which is described above referring to FIG. 13, and a second estimation pixel value from the pixel value of the right-side pixel that has the same color, is set to be the compensation pixel value of the attention pixel.

For example, if the attention pixel is G(x) that is illustrated in FIG. 13, the processing in (b) described above assigns the compensation pixel value as follows.

According to the following Equation, the first estimation pixel value GI(x) is calculated from the two G pixels, that is, G(x−4) and G(x−8), on the left side of G(x).

$$Gl(x)=G(x-4)+\{G(x-4)-G(x-8)\}$$

Moreover, according to Equation described below, the second estimation pixel value Gr(x) is calculated from the two G pixels, that is, G(x+4) and G(x+8) on the right side of G(x).

$$Gr(x)=G(x+4)+\{G(x+4)-G(x+8)\}$$

The maximum value, among two estimation pixel values of these: GI(x) and Gr(x), that is, max (GI(x), Gr(x)) that is the maximum pixel value that is any one of the GI(x) and Gr(x) that are selected according to Equations described above is set to be the compensation pixel value of the attention pixel G(x) that is the compensation target.

The compensation pixel value is assigned by such processing.

If there is a likelihood that the attention pixel will be the black dot, and the attention pixel is not in the concave texture, for example, any processing of the following defect compensation (c) and (d) is performed.

(c) Among the pixel values of the four pixels in the neighborhood of the attention pixel, which have the same color, the second pixel value (2nd_min) in the decreasing order of the pixel value is set to be the compensation pixel value of the attention pixel.

(d) The minimum value, among a first estimation pixel value from the pixel value of the left-side pixel that has the same color as the attention pixel, which is described above referring to FIG. 13, and a second estimation pixel value from the pixel value of the right-side pixel that has the same color, is set to be the compensation pixel value of the attention pixel.

For example, if the attention pixel is G(x) that is illustrated in FIG. 13, the processing in (d) described above assigns the compensation pixel value as follows.

According to the following Equation, the first estimation pixel value GI(x) is calculated from the two G pixels, that is, G(x−4) and G(x−8), on the left side of the G(x).

$$GI(x)=G(x-4)+\{G(x-4)-G(x-8)\}$$

Moreover, according to Equation described below, the second estimation pixel value Gr(x) is calculated from the two G pixels, that is, G(x+4) and G(x+8) on the right side of the G(x).

$$Gr(x)=G(x+4)+\{G(x+4)-G(x+8)\}$$

The minimum value, among two estimation pixel values of these: GI(x) and Gr(x), that is, min (GI(x), Gr(x)) that is the minimum pixel value that is any one of the GI(x) and Gr(x) that are selected according to Equations described above is set to be the compensation pixel value of the attention pixel G(x) that is the compensation target.

The compensation pixel value is assigned by such processing.

The defect compensation processing in Step S206 is executed as such compensation pixel value assignment processing of the attention pixel.

Next, in Step S210, it is determined whether or not the defect compensation processing in Steps 201 to 207 is performed on all the pixels that make up the image. If a non-processed pixel is present, returning to Step S201 takes place, and the processing is performed on the non-processed pixel by executing the processing in Step S201 and later.

In Step S210, when it is determined that the processing on all the pixels is ended, the processing is ended.

[4. Configuration Example of an Imaging Processing Apparatus]

Next, a configuration example of the image processing apparatus that executes the noise reduction processing and the defect compensation processing that are described above is described.

Figure 17:
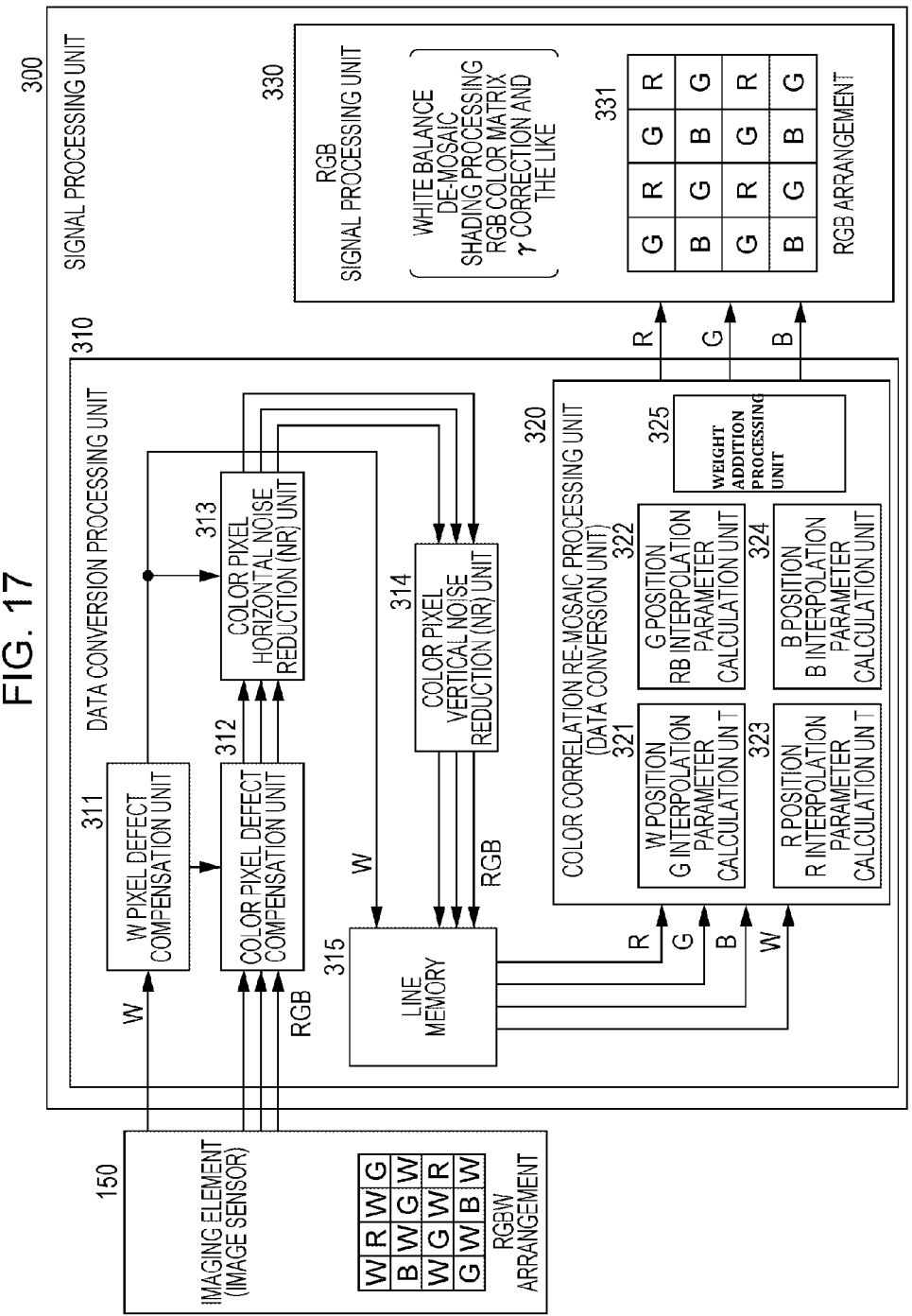
FIG. 17 is a diagram for describing the configuration of and the processing by the image processing apparatus according to the present disclosure.
Figure 18:
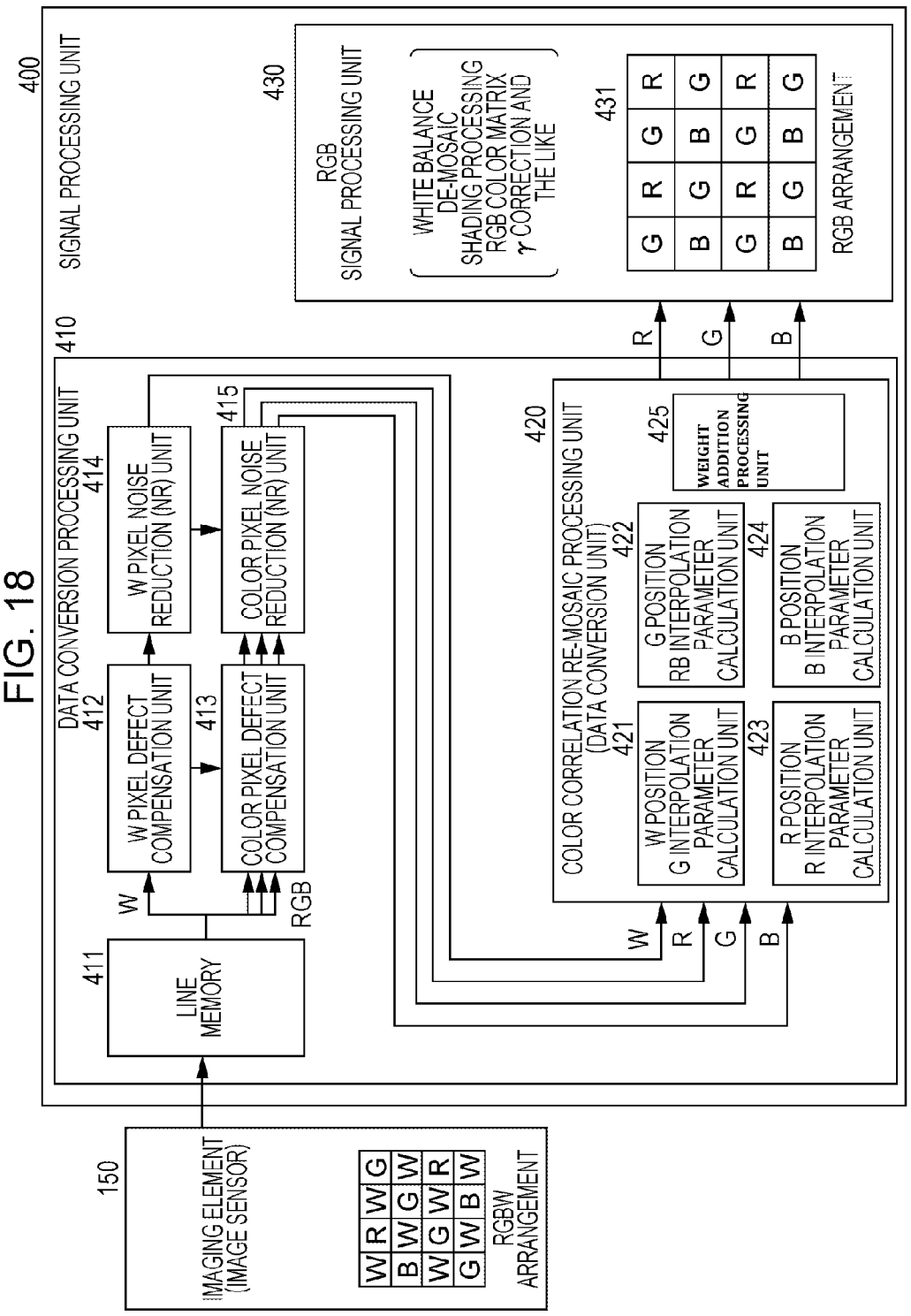
FIG. 18 is a diagram for describing the configuration of and the processing by the image processing apparatus according to the present disclosure.

Multiple configuration examples of the image processing apparatus according to the present disclosure are described referring FIGS. 16 to 18. The signal processing units that are described in FIGS. 16 to 18 are configured, for example, as signal processing units in the digital camera. FIGS. 16 to 18 are equivalent to signal processing units that are set as follows.

(a) A signal processing unit 200 that is illustrated in FIG. 16: a signal processing unit that executes the defect compensation processing that uses the one-dimensional (1D) pixel data and the noise reduction (NR) processing that uses the reference area that is a two-dimensional (2D) area.

(b) A signal processing unit 300 that is illustrated in FIG. 17: a signal processing unit that executes the defect compensation processing that uses the one-dimensional (1D) pixel data and the noise reduction (NR) processing.

(c) A signal processing unit 400 in FIG. 18: a signal processing unit that executes the defect compensation processing that uses the reference area that is the two-dimensional (2D) area and the noise reduction (NR) processing.

Configurations of and processing by such signal processing units are sequentially described below.

Moreover, any one of the signal processing units is configured to be, for example, within the digital camera, and for example, according to a program that is stored in a memory in the digital camera, inputs a control signal from a control unit that is configured from a CPU and the like, and according to timing or a sequence that is stipulated by the control signal, executes stipulated processing sequentially.

[4-1. Configuration Example 1 of the Image Processing Apparatus]

First, as a first configuration example of the image processing apparatus, an example of an image processing apparatus, which has the signal processing unit 200 that executes the defect compensation processing that uses the one-dimensional (1D) pixel data and the noise reduction (NR) processing that uses the reference area that is the two-dimensional (2D) area, is described referring to FIG. 16.

The signal processing unit 200 that is illustrated in FIG. 16 has a data conversion processing unit 210 and an RGB signal processing unit 230.

The data conversion processing unit 210, as illustrated in FIG. 16, sequentially inputs the pixel signals from an imaging element (image sensor) 150 that has the RGBW pixel arrangement, in the sequence of the pixels in the line in the horizontal direction.

The data conversion processing unit 210 selects the compensation target pixel in the sequence of the pixels in the line in the horizontal direction that are input from the imaging element (image sensor) 150 and thus executes the defect compensation processing that uses the one-dimensional (1D) pixel data and the noise reduction (NR) processing that uses the reference area that is the two-dimensional (2D) area.

First, in the W pixel defect compensation unit 211 and the color pixel defect compensation unit 212, the defect compensation processing is executed that is described referring to FIGS. 10 to 15, with regard to the item described above, that is, [3. Example of Processing that Performs Defect Compensation according to a Result of Texture Detection to which the W pixel is applied in Compensation Processing of the Color Pixel that is a Defect Compensation Target].

The W pixel defect compensation unit 211 executes the processing if the defect compensation target pixel (attention pixel) is the W pixel. The color pixel defect compensation unit 212 executes the processing if the defect compensation target pixel (attention pixel) is any color pixel of the R, G, and B other than the W pixel.

Moreover, in such processing, the color pixel defect compensation unit 212 performs the texture detection based on the W pixel as described above, and if it is determined that the attention pixel is in the texture area, outputs the original pixel value, as is, as the effective pixel value without performing the pixel value compensation of the attention pixel. If it is determined that the attention pixel is the defective pixel, but is not in the texture, the compensation is executed, and thus the compensation pixel value is assigned.

In the W pixel defect compensation unit 211 and the color pixel defect compensation unit 212, the pixel data, the defect compensation processing on which is ended, is stored in a line memory 213.

A next W pixel noise reduction (NR) processing unit 214, and a color pixel noise reduction (NR) processing unit 215 execute the noise reduction processing that sets the reference area that is the two-dimensional area, using the image data that is stored in the line memory 213. Such processing is the processing that is described referring to FIGS. 2 to 9 with regard to the item described above, that is, [2. Example of Processing that Calculates a Compensation Pixel Value of a Color Pixel by Interpolating a W Pixel at a Pixel Position of the Color Pixel that is a Compensation Target and Applying the Interpolation W Pixel].

For example, the noise reduction processing is performed that is described with regard to the item [2] described above, by setting the reference area, such as the 7×7 pixels of which the center is set to be the attention pixel that is set to be the processing target.

The W pixel noise reduction (NR) processing unit 214 executes the processing if a noise reduction processing target pixel (attention pixel) is the W pixel. The color pixel noise reduction (NR) processing unit 215 executes the processing if the noise reduction processing target pixel (attention pixel) is any color pixel of the R, G, and B other than the W pixel.

Moreover, in such processing, the color pixel noise reduction (NR) processing unit 215, as described above referring to FIGS. 3, 5, 7 and other figures, performs assigning of the interpolation W pixel to the positions of the attention pixel and the reference pixel in the reference area, and calculates the smoothing weight to which the interpolation W pixel is applied, and thus calculates the interpolation pixel value according to (Equation 1) described above.

However, if the interpolation W pixel is saturated, the compensation pixel value calculation processing to which (Equation 2) described above is applied is executed.

Moreover, the compensation pixel data on which each of the defect compensation processing and the noise reduction processing is performed is input into a color correlation re-mosaic processing unit 220.

The color correlation re-mosaic processing unit 220 inputs an RGBW signal that is an output signal from the W pixel noise reduction (NR) processing unit 214 and the color pixel noise reduction (NR) processing unit 215, and executes processing for conversion from an RGBW color arrangement to an RGB arrangement 231.

Specifically, for example, five types of conversion or compensation processing as are described below are executed.

Convert a position of the W pixel into the G pixel (Estimate the G pixel value)=(GonW)

Convert a position of the G pixel into the R pixel (Estimate the R pixel value)=(RonG)

Convert the position of the G pixel into the B pixel (Estimate the B pixel value)=(BonG)

Convert a position of the R pixel into the R pixel (Estimate the R pixel value)=(RonR)

Convert a position of the B pixel into the B pixel (Estimate the B pixel value)=(BonB)

Moreover, an aspect of such re-mosaic processing is one example, and the aspect of the re-mosaic processing is determined according to a correspondence relationship between an input image signal that is determined by a configuration of the color filter that is set in the imaging element, and an output image signal that is output to the RGB signal processing unit 230.

According to the present example, each constituent element of the color correlation re-mosaic processing unit 220 executes the following processing.

A W position G interpolation parameter calculation unit 221 calculates the interpolation parameter that is applied to calculation of the G pixel value that is assigned to the position of the W pixel in the RGBW arrangement.

A G position RB interpolation parameter calculation unit 222 calculates the interpolation parameter that is applied to calculation of the R pixel or the B pixel that is assigned to the position of the G pixel in the RGBW arrangement.

A R position R interpolation parameter calculation unit 223 calculates the interpolation parameter that is applied to calculation of the compensation R pixel value that is assigned to the position of the R pixel in the RGBW arrangement.

A B position B interpolation parameter calculation unit 224 calculates the interpolation parameter that is applied to calculation of the compensation B pixel value that is assigned to the position of the B pixel in the RGBW arrangement.

A weight addition processing unit 225 inputs the interpolation parameter that is calculated by each of the interpolation parameter calculation units 221 to 224, and calculates the RGB signal value of each pixel that makes up the RGB arrangement (Bayer arrangement) 231.

Moreover, for the processing for data conversion from the RGBW arrangement to the RGB arrangement, which is executed by the color correlation re-mosaic processing unit (data conversion unit) 220, basically, it is possible to use the processing that is disclosed in Japanese Unexampled Patent Application Publication No. 2011-55038 that was filed earlier by the applicant. Refer to Japanese Unexamined Patent Application Publication No. 2011-55038 for details of the processing for the data conversion processing.

In this manner, the RGB arrangement (Bayer arrangement) 231 that is generated by the weight addition processing unit 225 is output to the RGB signal processing unit 230.

The RGB signal processing unit 230 is the same as a signal processing unit to an RGB arrangement (Bayer arrangement) signal, which a general camera or image processing apparatus has. The RGB signal processing unit 230 generates the color image by executing the signal processing on the RGB arrangement (Bayer arrangement) 231 that is output from the weight addition processing unit 225. Specifically, the RGB signal processing unit 230 generates the color image by executing, for example, white balance adjustment processing, de-mosaic processing, shading processing, RGB color matrix processing, γ correction processing, and the like.

[4-2. Configuration Example 2 of the Image Processing Apparatus]

Next, as a configuration example of a second image processing apparatus, an example of an image processing apparatus that has the signal processing unit 300 that executes the defect compensation processing that uses the one-dimensional (1D) pixel data and the noise reduction (NR) processing is described referring to FIG. 17.

The signal processing unit 300 that is illustrated in FIG. 17 has a data conversion processing unit 310 and an RGB signal processing unit 330.

The data conversion processing unit 310, as illustrated in FIG. 17, sequentially inputs the pixel signals from the imaging element (image sensor) 150 that has the RGBW pixel arrangement, in the sequence of the pixels in the line in the horizontal direction.

The data conversion processing unit 310 selects the compensation target pixel in the sequence of the pixels in the line in the horizontal direction that are input from the imaging element (image sensor) 150 and thus executes the defect compensation processing that uses the one-dimensional (1D) pixel data and the noise reduction (NR) processing.

First, in the W pixel defect compensation unit 311 and the color pixel defect compensation unit 312, the defect compensation processing is executed that is described referring to FIGS. 10 to 15, with regard to the item described above, that is, [3. Example of Processing that Performs Defect Compensation according to a Result of Texture Detection to which the W pixel is applied in Compensation Processing of the Color Pixel that is a Defect Compensation Target].

The W pixel defect compensation unit 311 executes the processing if the defect compensation target pixel (attention pixel) is the W pixel. The color pixel defect compensation unit 312 executes the processing if the defect compensation target pixel (attention pixel) is any color pixel of the R, G, and B other than the W pixel.

Moreover, in such processing, the color pixel defect compensation unit 312 performs the texture detection based on the W pixel as described above, and if it is determined that the attention pixel is in the texture area, outputs the original pixel value, as is, as the effective pixel value without performing the pixel value compensation of the attention pixel. If it is determined that the attention pixel is the defective pixel, but is not in the texture, the compensation is executed, and thus the compensation pixel value is assigned.

In the W pixel defect compensation unit 311, the pixel data, the defect compensation processing on which is ended, is stored in the line memory 213.

In the color pixel defect compensation unit 312, the pixel data, the defect compensation processing on which is ended, is input into a color pixel horizontal noise reduction (NR) processing unit 313.

The color pixel horizontal noise reduction (NR) processing unit 313 sequentially inputs the pixel data, the defect compensation processing on which is ended in the color pixel defect compensation unit 312, as one-dimensional (1D) pixel line data, and executes the noise reduction processing that uses the one-dimensional (1D) pixel line data. Such processing is the processing that is described referring to FIG. 8 with regard to the item described above, that is, [2. Example of Processing that Calculates a Compensation Pixel Value of a Color Pixel by Interpolating a W Pixel at a Pixel Position of the Color Pixel that is a Compensation Target and Applying the Interpolation W Pixel].

As described referring to FIG. 8, the W pixel is interpolated at the position of the color pixel that is the noise reduction processing target and the position of the neighborhood pixel of the same color in the pixel line, the assigning of the interpolation W pixel is performed, the smoothing weight to which the interpolation W pixel is applied is calculated, and thus the compensation pixel value is calculated according to (Equation 1) described above.

However, if the interpolation W pixel is saturated, the compensation pixel value calculation processing to which (Equation 2) described above is applied is executed.

The pixel data in which the noise is reduced by applying a horizontal line is input into a color pixel vertical noise reduction (NR) unit 314.

The color pixel vertical noise reduction (NR) unit 314, for example, performs the compensation that refers to the pixel in the vertical direction, using the infinite impulse response (IIR) filter.

The output of the color pixel vertical noise reduction (NR) unit 314 is input into a line memory 315.

Moreover, the compensation pixel data on which each of the defect compensation processing and the noise reduction processing is performed, which is stored in the line memory 315, is input into a color correlation re-mosaic processing unit 320.

The color correlation re-mosaic processing unit 320 has a W position G interpolation parameter calculation unit 321, a G position RB interpolation parameter calculation unit 322, an R position R interpolation parameter calculation unit 323, a B position B interpolation parameter calculation unit 324, and a weight addition processing unit 325.

The color correlation re-mosaic processing unit 320, like the color correlation re-mosaic processing unit 220 described above referring to FIG. 16, executes the processing for the conversion from the RGBW color arrangement to an RGB arrangement 331, and thus outputs the generated RGB arrangement 331 to the RGB signal processing unit 330.

The RGB signal processing unit 330 is the same as a signal processing unit that performs the processing on the RGB arrangement (Bayer arrangement) signal, which is installed within a general camera or image processing apparatus. The RGB signal processing unit 330 generates the color image by executing the signal processing on the RGB arrangement (Bayer arrangement) 331 that is output from the weight addition processing unit 325. Specifically, the RGB signal processing unit 330 generates the color image by executing, for example, the white balance adjustment processing, the de-mosaic processing, the shading processing, the RGB color matrix processing, the γ correction processing, and the like.

[4-3. Configuration Example 3 of the Image Processing Apparatus]

Next, referring to FIG. 18, as a configuration example of a third image processing apparatus, an example of an image processing apparatus is described that has a signal processing unit 400 which executes the defect compensation processing that uses the reference area that is the two-dimensional (2D) area and the noise reduction (NR) processing.

The signal processing unit 400 that is illustrated in FIG. 18 has a data conversion processing unit 410 and an RGB signal processing unit 430.

The data conversion processing unit 410, as illustrated in FIG. 18, sequentially inputs the pixel signals from the imaging element (image sensor) 150 that has the RGBW pixel arrangement, in the sequence of the pixels in the line in the horizontal direction.

The data conversion processing unit 410 sequentially stores the pixels in the line in the horizontal direction, which are input from the imaging element (image sensor) 150, in a line memory 411, and thereafter, executes the defect compensation processing and the noise reduction (NR) processing using the two-dimensional (2D) image data that is stored in the line memory 411.

First, in a W pixel defect compensation unit 412 and a color pixel defect compensation unit 413, the defect compensation processing, which is described referring to FIGS. 10 to 15, with regard to the item described above, that is, [3. Example of Processing that Performs Defect Compensation according to a Result of Texture Detection to which the W pixel is applied in Compensation Processing of the Color Pixel that is a Defect Compensation Target], is executed on the image data stored in the line memory 411.

The W pixel defect compensation unit 412 executes the processing if the defect compensation target pixel (attention pixel) is the W pixel. The color pixel defect compensation unit 413 executes the processing if the defect compensation target pixel attention pixel) is any color pixel of the R, G, and B other than the W pixel.

Moreover, in such processing, the color pixel defect compensation unit 412 performs the texture detection based on the W pixel as described above, and if it is determined that the attention pixel is in the texture area, outputs the original pixel value, as is, as the effective pixel value without performing the pixel value compensation of the attention pixel. If it is determined that the attention pixel is the defective pixel, but is not in the texture, the compensation is executed, and thus the compensation pixel value is assigned.

In the W pixel defect compensation unit 411 and the color pixel defect compensation unit 412, the items of image data, the defect compensation processing on which are ended, are a next W pixel noise reduction (NR) processing unit 414 and a color pixel noise reduction (NR) processing unit 415, respectively.

A W pixel noise reduction (NR) processing unit 414 and a color pixel noise reduction (NR) processing unit 415 execute the noise reduction processing that sets the reference area that is the two-dimensional area. Such processing is the processing that is described referring to FIGS. 2 to 9 with regard to the item described above, that is, [2. Example of Processing that Calculates a Compensation Pixel Value of a Color Pixel by Interpolating a W Pixel at a Pixel Position of the Color Pixel that is a Compensation Target and Applying the Interpolation W Pixel].

For example, the noise reduction processing is performed that is described with regard to the item [2] described above, by setting the reference area, such as the 7×7 pixels of which the center is set to be the attention pixel that is set to be the processing target.

The W pixel noise reduction (NR) processing unit 414 executes the processing if the noise reduction processing target pixel (attention pixel) is the W pixel. The color pixel noise reduction (NR) processing unit 415 executes the processing if the noise reduction processing target pixel (attention pixel) is any color pixel of the R, G, and B other than the W pixel.

Moreover, in such processing, the color pixel noise reduction (NR) processing unit 415, as described above referring to FIGS. 3, 5, 7 and other figures, performs the assigning of the interpolation W pixel to the positions of the attention pixel and the reference pixel in the reference area, and calculates the compensation pixel value according to (Equation 1) described above by calculating the smoothing weight to which the interpolation W pixel is applied.

However, if the interpolation W pixel is saturated, the compensation pixel value calculation processing to which (Equation 2) described above is applied is executed.

Moreover, the compensation pixel data on which each of the defect compensation processing and the noise reduction processing is performed is input into a color correlation re-mosaic processing unit 420.

The color correlation re-mosaic processing unit 420 has a W position G interpolation parameter calculation unit 421, a G position RB interpolation parameter calculation unit 422, an R position R interpolation parameter calculation unit 423, a B position B interpolation parameter calculation unit 424, and a weight addition processing unit 425.

The color correlation re-mosaic processing unit 420, like the color correlation re-mosaic processing unit 220 described above referring to FIG. 16, executes the processing for the conversion from the RGBW color arrangement to an RGB arrangement 431, and thus outputs the generated RGB arrangement 431 to the RGB signal processing unit 430.

The RGB signal processing unit 430 is the same as a signal processing unit to the RGB arrangement (Bayer arrangement) signal, which is installed within a general camera or image processing apparatus. The RGB signal processing unit 430 generates the color image by executing the signal processing on the RGB arrangement (Bayer arrangement) 431 that is output from the weight addition processing unit 425. Specifically, the RGB signal processing unit 430 generates the color image by executing, for example, the white balance adjustment processing, the de-mosaic processing, the shading processing, RGB color matrix processing, the γ correction processing, and the like.

[5. Conclusions of Configurations of the Present Disclosure]

The examples according to the present disclosure are described in detail above referring to the specific examples. However, it is apparent that a person of ordinary skill in the art can accomplish modifications to or substitutes for the examples in a range that does not deviate from the gist of the present disclosure. That is, because the present invention is disclosed in the form of embodiments, the present invention should not be interpreted in a limited manner. In order to determine the gist of the present disclosure, the scope of the claims should be considered.

Moreover, the technology disclosed in the present specification can be configured as follows.

(1) An image processing apparatus including: a signal processing unit that executes pixel value compensation, in which the signal processing unit inputs image data in an RGBW arrangement that has each color pixel of R, G, and B and a white (W) pixel that passes through almost all wavelength light of each wavelength of the R, G, and B, and in which the signal processing unit interpolates the W pixel at a position of an attention pixel that is a compensation target, and at a position of a reference pixel which has the same color as the attention pixel within a reference area, in a pixel value compensation processing of a color pixel, calculates smoothing weight based on each pixel value of the interpolation W pixel, and thus calculates a compensation pixel value of the attention pixel by executing smoothing processing to which the calculated smoothing weight is applied.

(2) The image processing apparatus according to (1), in which the signal processing unit determines whether or not one or more saturation pixel values are present in the pixel values of the interpolation W pixel, in which if the saturation pixel value is not present in the pixel values of the interpolation W pixel, the signal processing unit calculates a compensation pixel value of the attention pixel by executing the smoothing processing to which the smoothing weight, calculated based on the each pixel value of the interpolation W pixel, is applied, and in which if the saturation pixel value is present in the pixel values of the interpolation W pixel, the signal processing unit calculates the compensation pixel value of the attention pixel by executing the smoothing processing to which the smoothing weight, calculated based on each pixel value of the attention pixel that is the compensation target, and of the reference pixel which has the same color as the attention pixel within the reference area, is applied without applying the interpolation W pixel.

(3) The image processing apparatus according to (1) or (2), in which the signal processing unit executes processing that interpolates the W pixel at the position of the reference pixel which has the same color as the attention pixel present in the reference area that is a two-dimensional area with the reference area as the two-dimensional area.

(4) The image processing apparatus according to any one of (1) to (3), in which the signal processing unit executes processing that interpolates the W pixel at the position of the reference pixel which has the same color as the attention pixel present in the reference area that is a one-dimensional area with the reference area as the one-dimensional area.

(5) The image processing apparatus according to any one of (1) to (4), in which the signal processing unit executes the pixel value compensation as noise reduction (NR) processing that reduces noise that is included in the attention pixel.

(6) The image processing apparatus according to any one of (1) to (5), in which the signal processing unit determines a likelihood of a defect, that is, determines whether or not there is a likelihood that the color pixel will be a defective pixel, in which the signal processing unit executes texture detection processing that determines whether or not the color pixel is in a texture area, by applying the W pixel in the neighborhood of the color pixel that is determined as having the likelihood of the defect, in which in the texture detection processing, if it is determined that the color pixel is in the texture area, the signal processing unit does not execute defect compensation processing, and in which in the texture detection processing, if it is determined that the color pixel is not in the texture area, the signal processing unit executes the defect compensation processing.

(7) The image processing apparatus according to (6), in which in the texture detection processing, the signal processing unit determines whether or not the color pixel is in the texture area, by applying a difference in the pixel value between the W pixel that is closest to the color pixel that is determined as having the likelihood of the defect, and the W pixel outside of the closest W pixel.

Moreover, a method of implementing the processing that is executed in the apparatus described above and a system, or a program that executes the processing, and a recording medium on which the program is stored are included in the configuration according to the present disclosure.

Furthermore, it is possible to execute a sequence of the processing described throughout the specification in hardware, software, or a combination configuration of both. If the processing is executed in software, a program in which the processing sequence is recorded is installed on a memory within a computer that is integrated into dedicated hardware and thus is executed, but alternatively it is possible to install the program on an all-purpose computer that is capable of executing a variety of processing and thus the program. For example, the program can be recorded in advance on a recording medium. In addition to installing the program on the computer from the recording medium, the program can be received over a network, such as a local area network (LAN) or the Internet, and can be installed on the recording medium, such as built-in hardware.

Moreover, the variety of processing described in the specification is executed not only in a time series according to the description, but may also be executed in parallel or individually according to the processing capability of an apparatus that executes the processing or whenever necessary. Furthermore, the system in the present specification is configured to be a logical combination of multiple apparatuses, and the apparatuses in each configuration are not limited to being within the same housing.

INDUSTRIAL APPLICABILITY

With the configuration of an example according to the present disclosure, as described above, the apparatus for and a method of executing the noise reduction processing and the defect compensation processing on the image in the RGBW arrangement are realized.

Specifically, in the pixel value compensation processing of the color pixel that makes up the image data in the RGBW arrangement that has each color pixel of the R, G, and B and the white (W) pixel, the W pixel is interpolated at the position of the attention pixel that is the compensation target, and at the position of the reference pixel that is the pixel that has the same color as the attention pixel within the reference area, the smoothing weight is calculated based on each pixel value of the interpolation W pixel, and thus the compensation pixel value of the attention pixel is calculated by executing the smoothing processing to which the calculated smoothing weight is applied. Moreover, by applying the W pixel in the neighborhood of the color pixel, it is determined whether or not the color pixel is in the texture area, and only if the color pixel is in the texture, the defect compensation processing is executed.

With such processing, the apparatus for and the method of executing the noise reduction processing and the defect compensation processing on the image in the RGBW arrangement are realized.

REFERENCE SIGNS LIST

150 IMAGING ELEMENT, 200 SIGNAL PROCESSING UNIT, 210 DATA CONVERSION PROCESSING UNIT, 211 W PIXEL DEFECT COMPENSATION UNIT, 212 COLOR PIXEL DEFECT COMPENSASTION UNIT, 213 LINE MEMORY, 214 W PIXEL NOISE REDUCTION (NR) UNIT, 215 COLOR PIXEL NOISE REDUCTION (NR) UNIT, 220 COLOR CORRELATION RE-MOSAIC PROCESSING UNIT, 221 W POSITION G INTERPOLATION PARAMETER CALCULATION UNIT, 222 G POSITION RB INTERPOLATION PARAMETER CALCULATION UNIT, 223 R POSITION R INTERPOLATION PARAMETER CALCULATION UNIT, 224 B POSITION B INTERPOLATION PARAMETER CALCULATION UNIT, 225 WEIGHT ADDITION UNIT, 230 RGB SIGNAL PROCESSING UNIT, 231 RGB ARRANGEMENT, 300 SIGNAL PROCESSING UNIT, 310 DATA CONVERSION PROCESSING UNIT, 311 W PIXEL DEFECT COMPENSATION UNIT, 312 COLOR PIXEL DEFECT COMPENSATION UNIT, 313 COLOR PIXEL HORIZONTAL NOISE REDUCTION (NR) UNIT, 314 COLOR PIXEL VERTICAL NOISE REDUCTION (NR) UNIT, 315 LINE MEMORY, 320 COLOR CORRELATION RE-MOSAIC PROCESSING UNIT, 321 W POSITION G INTERPOLATION PARAMETER CALCULATION UNIT, 322 G POSITION RB INTERPOLATION PARAMETER CALCULATION UNIT, 323 R POSITION R INTERPOLATION PARAMETER CALCULATION UNIT, 324 B POSITION B INTERPOLATION PARAMETER CALCULATION UNIT, 325 WEIGHT ADDITION UNIT, 330 RGB SIGNAL PROCESSING UNIT, 331 RGB ARRANGEMENT, 400 SIGNAL PROCESSING UNIT, 410 DATA CONVERSION PROCESSING UNIT, 411 LINE MEMORY, 412 W PIXEL DEFECT COMPENSATION UNIT, 413 COLOR PIXEL DEFECT COMPENSATION UNIT, 414 W PIXEL NOISE REDUCTION (NR) UNIT, 415 COLOR PIXEL NOISE REDUCTION (NR) UNIT, 420 COLOR CORRELATION RE-MOSAIC PROCESSING UNIT, 421 W POSITION G INTERPOLATION PARAMETER CALCULATION UNIT, 422 G POSITION RB INTERPOLATION PARAMETER CALCULATION UNIT, 423 R POSITION R INTERPOLATION PARAMETER CALCULATION UNIT, 424 B POSITION B INTERPOLATION PARAMETER CALCULATION UNIT, 425 WEIGHT ADDITION UNIT, 430 RGB SIGNAL PROCESSING UNIT, 431 RGB ARRANGEMENT

The invention claimed is:

1. An image processing apparatus comprising circuitry configured to:
receive image data acquired by an image sensor in an RGBW arrangement that has each color pixel of R, G, and B and a white (W) pixel that passes through almost all wavelength light of each wavelength of the R, G, and B,
interpolate W pixels at a position of an attention pixel that is a compensation target, and at a position of a reference pixel which has the same color as the attention pixel within a reference area, in a pixel value compensation processing of a color pixel,
calculate smoothing weight based on pixel values of the interpolation W pixels, and thus calculate a compensation pixel value of the attention pixel by executing smoothing processing to which the calculated smoothing weight is applied, wherein the smoothing processing comprises computing a product of (a) a pixel value of the reference pixel which has the same color as the attention pixel and (b) a difference between the pixel value of the interpolation W pixel at the position of the attention pixel and the pixel value of the interpolation W pixel at the position of the reference pixel, and provide the compensation value of the attention pixel to further circuitry for use in generating a display image that corresponds to a sensed image that was sensed by the image sensor.

2. The image processing apparatus according to claim 1, wherein the circuitry is further configured to determine whether or not one or more saturation pixel values are present in the pixel values of the interpolation W pixels, wherein if the saturation pixel value is not present in the pixel values of the interpolation W pixels, the circuitry calculates a compensation pixel value of the attention pixel by executing the smoothing processing to which the smoothing weight, calculated based on the pixel values of the interpolation W pixels, is applied, and wherein if the saturation pixel value is present in the pixel values of the interpolation W pixels, the circuitry calculates the compensation pixel value of the attention pixel by executing the smoothing processing to which the smoothing weight, calculated based on each pixel value of the attention pixel that is the compensation target, and of the reference pixel which has the same color as the attention pixel within the reference area, is applied without applying the interpolation W pixels.

3. The image processing apparatus according to claim 1, wherein the circuitry is further configured to execute processing that interpolates the W pixel at the position of the reference pixel which has the same color as the attention pixel present in the reference area that is a two-dimensional area with the reference area as the two-dimensional area.

4. The image processing apparatus according to claim 1, wherein the circuitry is further configured to execute processing that interpolates the W pixel at the position of the reference pixel which has the same color as the attention pixel present in the reference area that is a one-dimensional area with the reference area as the one-dimensional area.

5. The image processing apparatus according to claim 1, wherein the circuitry is further configured to execute pixel value compensation as noise reduction (NR) processing that reduces noise that is included in the attention pixel.

6. The image processing apparatus according to claim 1, wherein the circuitry is further configured to determine a likelihood of a defect, that is, determines whether or not there is a likelihood that the color pixel will be a defective pixel, wherein the circuitry is further configured to execute texture detection processing that determines whether or not the color pixel is in a texture area, by applying a W pixel in the neighborhood of the color pixel that is determined as having the likelihood of the defect, wherein in the texture detection processing, if it is determined that the color pixel is in the texture area, the circuitry does not execute defect compensation processing, and wherein in the texture detection processing, if it is determined that the color pixel is not in the texture area, the circuitry executes the defect compensation processing.

7. The image processing apparatus according to claim 6, wherein in the texture detection processing, the circuitry determines whether or not the color pixel is in the texture area, by applying a difference in the pixel value between a W pixel that is closest to the color pixel that is determined as having the likelihood of the defect, and a W pixel outside of the closest W pixel.

8. An image processing method of executing pixel value compensation in an image processing device, wherein the image processing device performs:

receiving image data acquired by an image sensor in an RGBW arrangement that has each color pixel of R, G, and B and a white (W) pixel that passes through almost all wavelength light of each wavelength of the R, G, and B;

interpolating W pixels at a position of an attention pixel that is a compensation target, and at a position of a reference pixel which has the same color as the attention pixel within a reference area, in a pixel value compensation processing of a color pixel;

calculating smoothing weight based on pixel values of the interpolation W pixels;

calculating a compensation pixel value of the attention pixel by executing smoothing processing to which the calculated smoothing weight is applied, wherein the smoothing processing comprises computing a product of (a) a pixel value of the reference pixel which has the same color as the attention pixel and (b) a difference between the pixel value of the interpolation W pixel at the position of the attention pixel and the pixel value of the interpolation W pixel at the position at the reference pixel; and providing the compensation value of the attention pixel to circuitry for use in generating a display image that correspond to a sensed image that was sensed by the image sensor.

9. A non-transitory computer readable medium encoded with instructions which, when executed by a processor of an image processing apparatus, cause the image processing apparatus to execute pixel value compensation comprising acts of:

receiving image data acquired by an image sensor in an RGBW arrangement that has each color pixel of R, G, and B and a white (W) pixel that passes through almost all wavelength light of each wavelength of the R, G, and B;

interpolating W pixels at a position of an attention pixel that is a compensation target, and at a position of a reference pixel which has the same color as the attention pixel within a reference area, in a pixel value compensation processing of a color pixel;

calculating smoothing weight based on pixel values of the interpolation W pixels;

calculating a compensation pixel value of the attention pixel by executing smoothing processing to which the calculated smoothing weight is applied, wherein the smoothing processing comprises computing a product of (a) a pixel value of the reference pixel which has the same color as the attention pixel and (b) a difference between the pixel value of the interpolation W pixel at the position of the attention pixel and the pixel value of the interpolation W pixel at the position of the reference pixel; and providing the compensation value of the attention pixel to circuitry for use in generating a display image that corresponds to a sensed image that was sensed by the image sensor.

10. The image processing apparatus according to claim 1, wherein the circuitry comprises a programmed computer.

* * * * *